(12) United States Patent
Aihara

(10) Patent No.: US 11,186,095 B2
(45) Date of Patent: Nov. 30, 2021

(54) MEDIUM CONVEYING APPARATUS AND IMAGE FORMING APPARATUS

(71) Applicant: Yuichi Aihara, Yamanashi-ken (JP)

(72) Inventor: Yuichi Aihara, Yamanashi-ken (JP)

(73) Assignee: CANON FINETECH NISCA INC., Misato (JP)

( * ) Notice: Subject to any disclaimer, the term of this patent is extended or adjusted under 35 U.S.C. 154(b) by 316 days.

(21) Appl. No.: 15/790,715

(22) Filed: Oct. 23, 2017

(65) Prior Publication Data

US 2018/0111387 A1 Apr. 26, 2018

(30) Foreign Application Priority Data

Oct. 21, 2016 (JP) .............................. JP2016-206656
Oct. 21, 2016 (JP) .............................. JP2016-206657

(51) Int. Cl.
  *B65H 7/06* (2006.01)
  *B41J 2/32* (2006.01)
  (Continued)

(52) U.S. Cl.
  CPC ................ *B41J 2/32* (2013.01); *B41J 2/325* (2013.01); *G06K 17/0016* (2013.01); *B65H 7/06* (2013.01);
  (Continued)

(58) Field of Classification Search
  CPC ... B65H 5/18; B65H 7/06; B65H 7/12; B65H 7/125; B65H 29/60; B65H 29/62;
  (Continued)

(56) References Cited

U.S. PATENT DOCUMENTS 5,502,312 A 3/1996 Lorenzo
5,959,278 A 9/1999 Kobayashi et al.
(Continued)

FOREIGN PATENT DOCUMENTS

JP H02-161580 A 6/1990
JP H04-137548 U 12/1992
(Continued)

OTHER PUBLICATIONS

Japan Patent Office, "Office Action for Japanese Patent Application No. 2016-206656," dated Aug. 17, 2020.
(Continued)

*Primary Examiner* — Howard J Sanders
(74) *Attorney, Agent, or Firm* — Manabu Kanesaka

(57) ABSTRACT

Disclosed herein is a medium conveying apparatus in which unjamming can be efficiently performed. The medium conveying apparatus includes conveyance rollers configured to convey a card, a rotary unit configured to hold and rotate the card, sensors SN2 and SN26 configured to detect the distance the card has been conveyed, and a control section. If the distance the card has been conveyed that has been detected by the sensors SN2 and SN26 differs from a preset distance L1 (Yes in Step S320), the control section determines (in S328 and S336) whether the card can be positioned in a direction to be delivered from the rotary unit. If the card can be so positioned, a drive motor is controlled, rotating the rotary unit to position the card to be delivered.

11 Claims, 14 Drawing Sheets

(51) Int. Cl.
  *B41J 2/325* (2006.01)
  *G06K 17/00* (2006.01)
  *B65H 29/62* (2006.01)
  *B65H 43/04* (2006.01)
  *B65H 29/60* (2006.01)

(52) U.S. Cl.
  CPC .............. *B65H 29/60* (2013.01); *B65H 29/62* (2013.01); *B65H 43/04* (2013.01)

(58) Field of Classification Search
  CPC ........ B65H 85/00; B65H 31/24; B65H 43/04; B65H 2701/1914; B65H 2404/1421
  See application file for complete search history.

(56) References Cited

U.S. PATENT DOCUMENTS

| | | | |
|---|---|---|---|
| 7,156,387 B2 | 1/2007 | Hidaka et al. | |
| 7,878,505 B2 * | 2/2011 | Meier | B65H 5/18 271/176 |
| 8,721,205 B2 * | 5/2014 | Francis | B41J 13/12 101/485 |
| 8,810,619 B2 * | 8/2014 | Kaneoya | B41J 2/325 347/213 |
| 8,820,743 B2 * | 9/2014 | Takei | B41J 13/12 271/302 |
| 8,876,110 B2 * | 11/2014 | Hoffman | B65H 5/04 235/379 |
| 2002/0060417 A1 * | 5/2002 | Hiramitsu | B65H 9/002 271/227 |
| 2004/0051059 A1 * | 3/2004 | Ungpiyakul | A61F 13/15772 250/559.29 |
| 2012/0286464 A1 | 11/2012 | Takei et al. | |
| 2017/0158452 A1 * | 6/2017 | Ikari | G07D 7/1205 |

FOREIGN PATENT DOCUMENTS

| | | |
|---|---|---|
| JP | H05-262443 A | 10/1993 |
| JP | H09-131930 A | 5/1997 |
| JP | H09-226982 A | 9/1997 |
| JP | 2000-226134 A | 8/2000 |
| JP | 2004-083210 A | 3/2004 |
| JP | 2008-162113 A | 7/2008 |
| JP | 2011-136783 A | 7/2011 |
| JP | 2011-209909 A | 10/2011 |
| JP | 2015-153270 A | 8/2015 |
| JP | 2016-160058 A | 9/2016 |

OTHER PUBLICATIONS

Japan Patent Office, "Office Action for Japanese Patent Application No. 2016-206657," dated Sep. 2, 2020.

\* cited by examiner

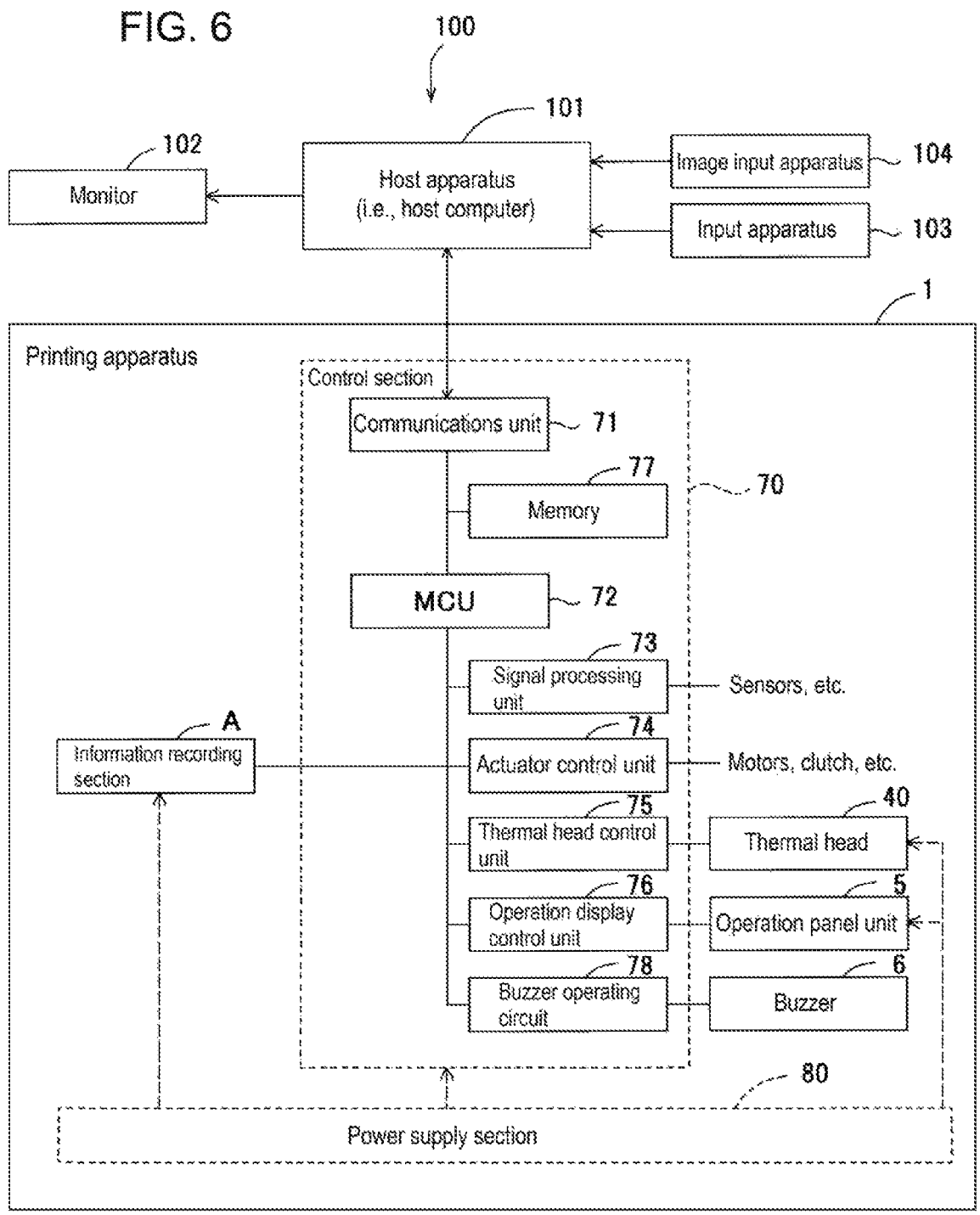

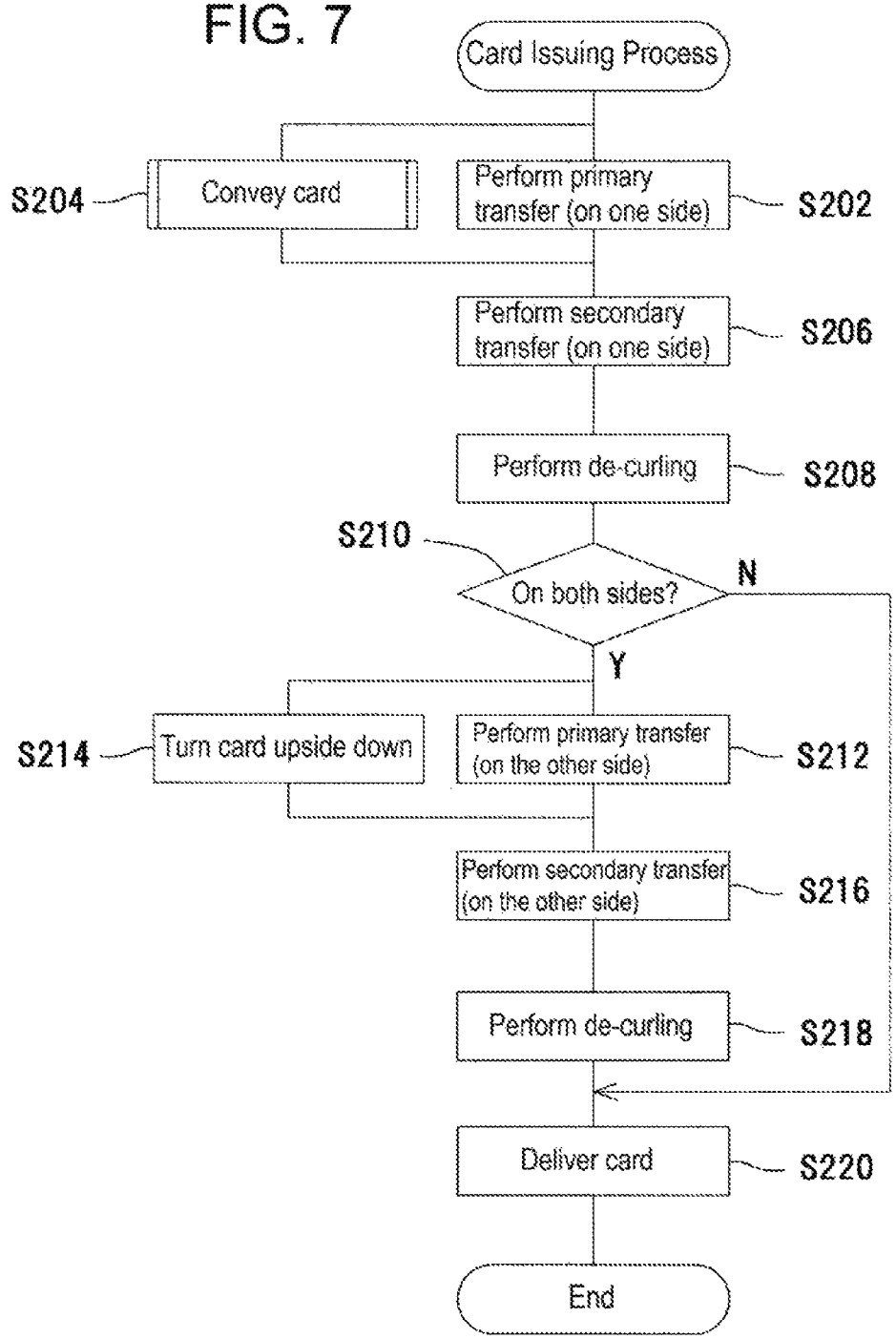

MEDIUM CONVEYING APPARATUS AND IMAGE FORMING APPARATUS

BACKGROUND OF THE INVENTION

Field of the Invention

This invention relates to a medium conveying apparatus and an image forming apparatus, more particularly to a medium conveying apparatus having a direction changing section for changing the direction of conveying media and to an image forming apparatus having this medium conveying apparatus.

Description of the Related Art

Hitherto known well is an image forming apparatus that forms an image on a hard medium such as a card or a disc, or on a semi-hard medium. An image forming apparatus of this type performs indirect printing or direct printing. In the indirect printing, an ink ribbon is used, forming an image (i.e., mirror image) on one side of a transfer film, and the image is transferred from the transfer film onto one side of a medium. In the direct printing, an ink ribbon is used, forming an image directly on one side of a medium.

In such an image forming apparatus, the image forming section forms an image on the medium held between the platen roller and the thermal head as heat is applied to the thermal head through the ink ribbon in accordance with print data. Today, color printing is widely performed, forming images of different colors, one image overlapping another.

Among these apparatuses, an image forming apparatus is known, which includes a direction changing section for changing the direction of conveying a medium so that the apparatus may be compact. Patent Document 1, for example, discloses an image forming apparatus that has rotary members (reversing units F and G) configured to rotate a card and has sensors arranged around the rotary members. In this apparatus, after the medium is detected by the sensors and conveyed into the rotary members, the rotary members are rotated, thereby changing the direction of conveying the medium.

A similar technique is disclosed in Patent Document 2. Patent Document 3 discloses a direction changing section that changes the conveyance direction, while holding the card, though it cannot turn a card upside down (or rotate it by 180°) as in the apparatuses disclosed in Patent Documents 1 and 2.

PRIOR ART DOCUMENT

Patent Document

[Patent Document 1] Japanese Patent Application Publication No. 2011-209909 (see FIG. 3, reference numerals F and G)
[Patent Document 2] Japanese Patent Application Publication No. 2015-153270 (see FIG. 1, reference numeral 40)
[Patent Document 3] Japanese Patent Application Publication No. 2008-162113 (see FIG. 10, reference numeral 60)

In the apparatuses disclosed in Patent Document 1 (and Patent Document 2), the conveyance distance of the medium (i.e., card) is detected. If the distance detected exceeds a preset value, the medium is considered an erroneous one and is therefore stopped. Consequently, the medium is held between the rotary members, and the operator must remove the medium so jamming.

The conveyance distance of each medium is detected, mainly because it necessary to detect whether media are conveyed together, or multi-fed. (The media must be conveyed one at a time.) The conveyance distance of each medium is detected, also because any medium longer or shorter than the prescribed length must not be conveyed. Further, the operator must remove the medium from the rotary members (for example, if the medium cannot be automatically delivered), because if the medium is shorter than the prescribed length, the loci of the ends of the medium nipped by the rotary members may interfere with members (e.g., sensors) arranged around the rotary member and may damage the members or the medium itself.

SUMMARY OF THE INVENTION

In view of the above, this invention has been made. The object of this invention is to provide a medium conveying apparatus that operates well even if the medium jams, and to provide an image forming apparatus that includes this medium conveying apparatus.

To achieve the object, a first embodiment of the invention is a medium conveying apparatus including: a conveyance section configured to convey a medium; a direction changing section configured to change the direction in which the medium is conveyed by the conveyance section; a detection section configured to detect the distance the medium has been conveyed by the conveyance section; and a control section configured to control the direction changing section. If the distance detected by the detection section differs from a preset distance L1, the control section determines whether the medium can be positioned in such a direction as to be delivered from the direction changing section. If the medium can be so positioned, the control section controls the direction changing section, thereby positioning the medium in said direction.

In the first embodiment, if the distance detected differs from the preset distance L1, the control section may determine whether the medium can be positioned in a direction to be delivered as an erroneous one. The detection section may have first and second sensors arranged upstream and downstream the direction changing section in the medium conveyance direction, and is used to detect the rear and front end of the medium conveyed by the conveyance section, thereby to detect the distance the medium has been conveyed. The control section may determine whether the medium can be positioned in such a direction as to be delivered from the direction changing section, if the distance detected by the detection section is shorter than the preset distance L1. In this case, if the distance the medium has been conveyed is equal to or longer than a preset distance L2 (L2<L1), the control section may determine that the medium can be positioned in such a direction as to be delivered, and if the distance the medium has been conveyed is shorter than the preset distance L2, the control section may determine that the medium cannot be positioned in a such direction as to be delivered.

The detection section may have a first sensor arranged upstream the direction changing section in the medium conveyance direction, and used to detect the front and rear ends of the medium conveyed by the conveyance section, thereby to detect the distance the medium has been conveyed. The control section may determine whether the medium can be positioned in such a direction as to be delivered from the direction changing section, if the distance detected by the detection section is longer than the preset distance L1. If the distance the medium has been conveyed is equal to or shorter than a preset distance L2 (L2>L1), the control section may determine that the medium can be positioned in such a direction as to be delivered. If the distance the medium has been conveyed is longer than the preset distance L2, the control section may determine that the medium cannot be positioned in such a direction as to be delivered.

The direction changing section may be a rotary member configured to hold and rotate the medium. If the control section determines that the medium can be positioned to be delivered, the rotary member may first control the conveyance section to position the center part of the medium at the rotation center of the rotary member, and may then control the rotary member to rotate the medium in the direction to be delivered. Further, the direction changing section may be a rotary member configured to hold and rotate the medium. If the control section determines that the medium cannot be positioned to be delivered, it controls the conveyance section, thereby conveying the medium back upstream the direction changing section without rotating the rotary member. Still further, if the distance the medium has been conveyed is different from preset distance L1, the control section may determine, from the distance the medium has been conveyed, whether the medium can be rotated in at least one of the clockwise and counterclockwise directions.

To achieve the object, a second embodiment of the invention is an image forming apparatus including an image forming section configured to form an image on a medium, and a medium conveying apparatus according to the first embodiment.

In this invention, if the distance the media has been conveyed differs from the distance L1, the control section determines whether the medium can be positioned in such a direction as to be delivered from the direction changing section. If the medium is found able to be so positioned, the control section controls the direction changing section, positioning the medium in that direction. This results in the advantage of enhancing the unjamming efficiency.

BRIEF DESCRIPTION OF THE DRAWINGS

FIG. 6 is a block diagram schematically illustrating the control section of the printing apparatus;

FIG. 7 is a flowchart of the card issuing routine performed by the CPU of the microcomputer unit of the control section provided in the printing apparatus;

FIG. 9A showing the multi-fed cards supplied to the rotary unit, FIG. 9B showing the cards having their front ends reaching the sensor for detecting their front ends, and FIG. 9C showing the multi-fed cards having their middle parts positioned at the rotation center of the rotary unit;

FIG. 10A showing how the rotary unit is driven, positioning the multi-fed cards in the wrong delivery direction, and FIG. 10B showing how the multi-fed cards are delivered toward the reject stacker;

FIG. 11A showing the rotary unit able to rotate clockwise and counterclockwise, FIG. 11B showing the rotary unit able to rotate counterclockwise only, and FIG. 11C showing the rotary unit unable to rotate clockwise or counterclockwise;

FIG. 14A showing multi-fed cards rotated and held, at one end, by a pair of rollers, to be delivered as erroneous cards; FIG. 14B showing the multi-fed cards held, at the other end, by another pair of rollers, to be delivered toward the non-contact IC recording section, and FIG. 14C showing the multi-fed cards held by a pair of rollers provided in the medium conveyance path.

DESCRIPTION OF THE EMBODIMENTS

An embodiment of this invention will be described as a printing apparatus designed to print characters or an image on a card and to record information magnetically or electrically on the card.

1. Configuration 1-1 System Configuration

Figure 1:
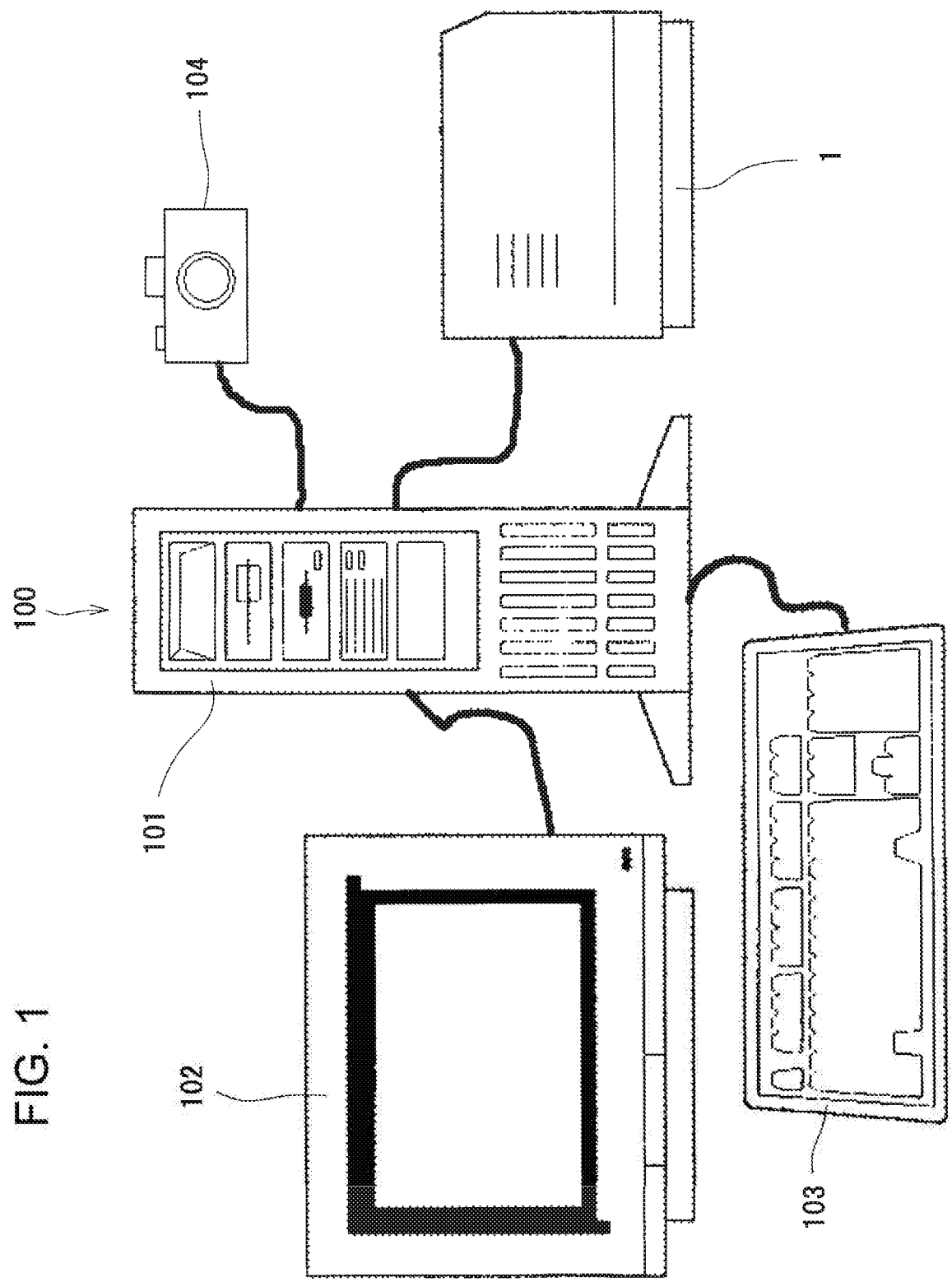
FIG. 1 is a diagram schematically showing a printing system including a printing apparatus according to an embodiment of the present invention.

As shown in FIG. 1 and FIG. 6, the printing apparatus 1 according to this embodiment constitutes a part of a printing system 100. The printing system 100 includes a host apparatus 101 (e.g., host computer such as a personal computer) and a printing apparatus 1.

The printing apparatus 1 is connected by an interface (not shown) to the host apparatus 101. The host apparatus 101 transmits print data, magnetic or electric record data, and the like, to the printing apparatus 1, instructing the printing apparatus 1 to print the data. The printing apparatus 1 has an operation panel unit 5 (i.e., operation display unit, see FIG. 3 and FIG. 6), and can record data in accordance with the instructions coming not only from the host apparatus 101 but also from the operation panel unit 5.

To the host apparatus 101, an image input apparatus 104 (e.g., digital camera or scanner), an input apparatus 103 (e.g., keyboard or mouse), and a monitor 102 (e.g., liquid crystal display) are connected. The input apparatus 103 is configured to input instructions and data to the host apparatus 101. The monitor 102 is configured to display the data generated by the host apparatus 101.

1-2 Printing Apparatus 1-2-1 Mechanical Sections

Figure 2:
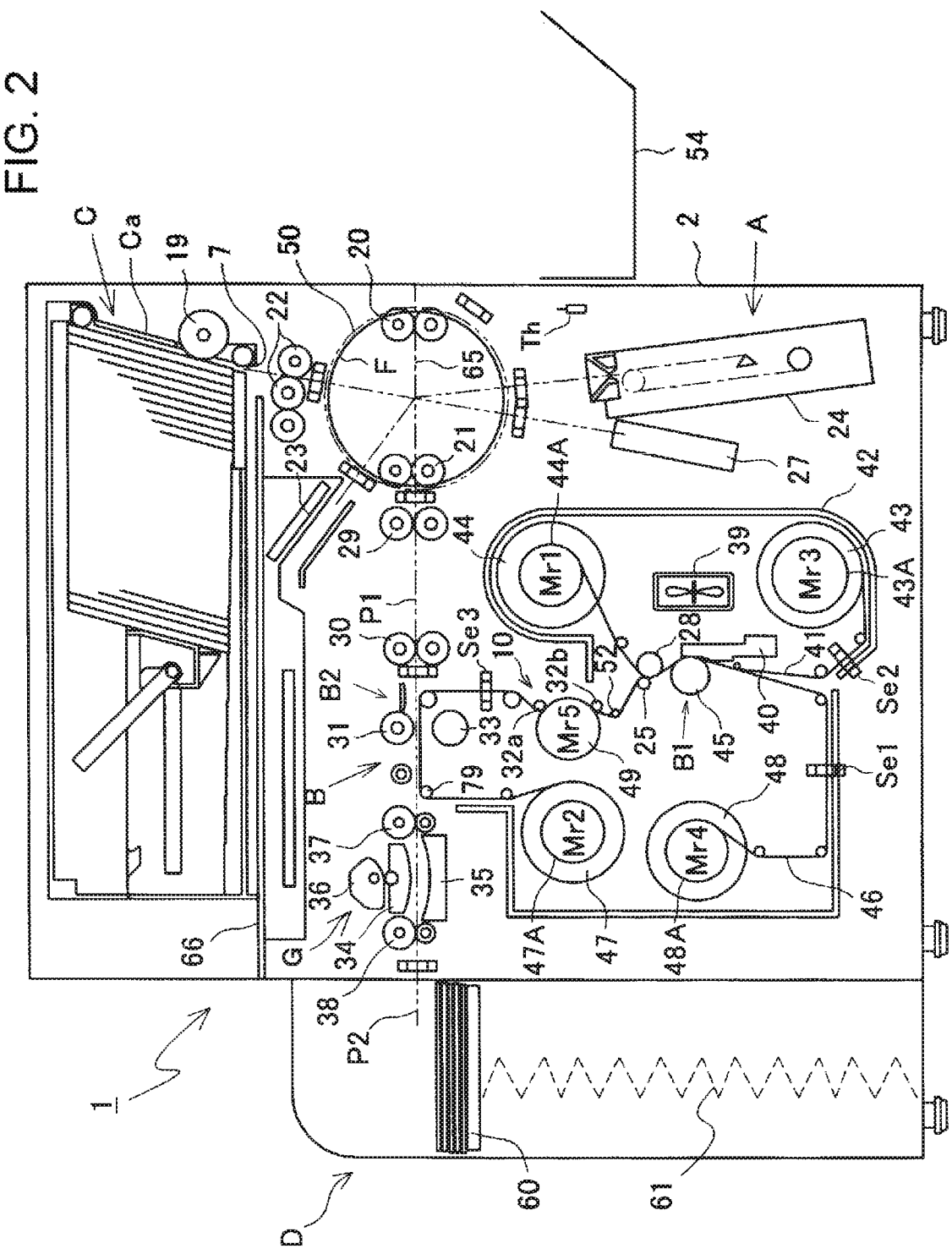
FIG. 2 is a front view schematically illustrating the printing apparatus.

As shown in FIG. 2, the printing apparatus 1 has a housing 2. The housing 2 incorporates an information recording section A, a printing section B, a rotary unit F, and a de-curling mechanism G. Further, the printing apparatus 1 has a medium supplying section C, a medium storing section D, and a rejected-sheet stacker 54. The medium supplying section C is mountable on the housing 2. The rejected-sheet stacker 54 is provided on that side of the housing 2, which faces away from the medium storing section D.

(1) Information Recording Section A

The information recording section A is composed of a magnetic recording unit 24, a noncontact IC recording unit 23, and a contact IC recording unit 27. The three recording units are optional components. At least one of them is used in accordance with the user's request.

(2) Medium Supplying Section C

Figure 4:
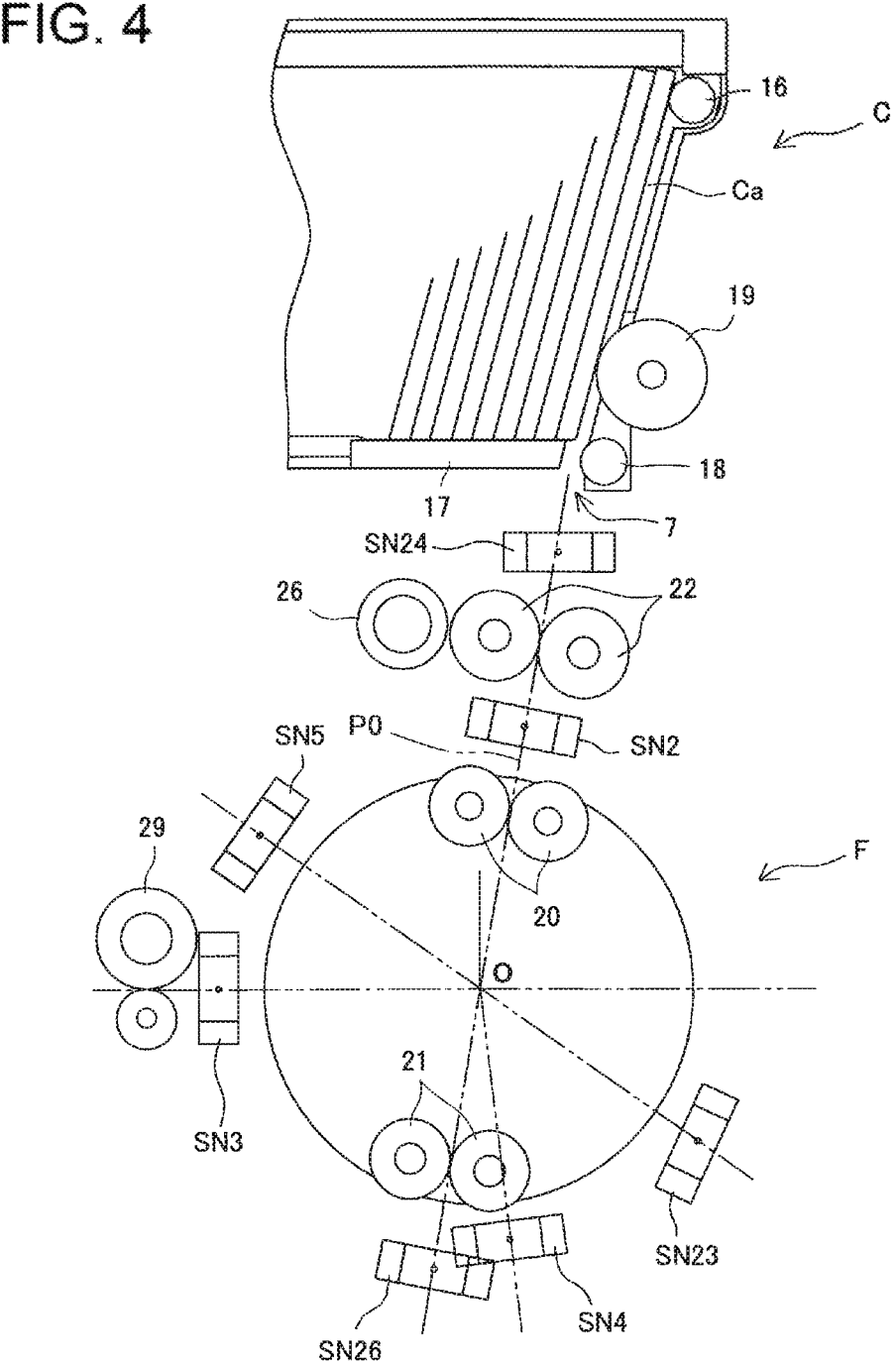
FIG. 4 is a diagram showing where sensors are arranged around the medium supplying section and around a rotary unit.

The medium supplying section C is composed of a card cassette for holding a plurality of cards Ca in standing position (more precisely, held inclined by 10° in this example). In this embodiment, the cards Ca have the standard size, i.e., 85.6 mm (length)×53.9 mm (width). As shown in FIG. 4, an idling roller 16 is arranged above that end of the card cassette, at which the front end (i.e., leading end) of each card lies in the card cassette, and a separating pad 17 is provided at the bottom of the card cassette. The separating pad 17 is a plate-like resilient member made of material having a large coefficient of friction, such as rubber.

In the housing of the printing apparatus 1, a pickup roller 19 (see FIG. 3) and an idle roller 18 are arranged. The pickup roller 19 is configured to convey the front-most card Ca from the card cassette. The idle roller 18 is arranged below the pickup roller 19 and opposes the separating pad 17. Hence, between the idle roller 18 and the separating pad 17, a card separating opening 7 is provided to separate a card Ca from the next card. The pickup roller 19 is rotated by a pickup motor (e.g., stepping motor, not shown). In this embodiment, the width of the card separating opening 7 can be adjusted in accordance with the thickness of the cards. The operator may rotate the rotary member arranged at the bottom of the card cassette, thereby to move the separating pad 17 toward or away from the idle roller 18.

Figure 3:
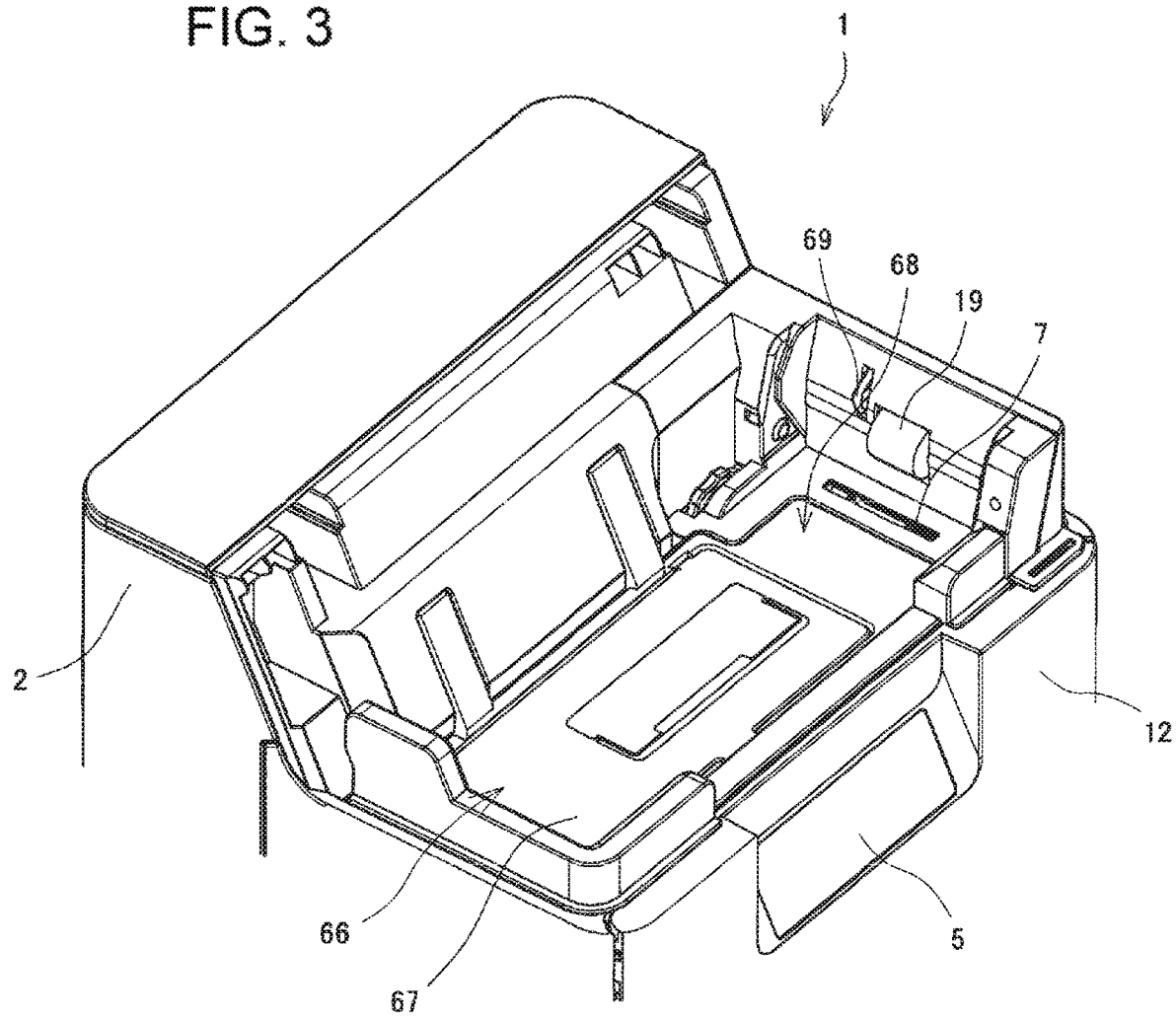
FIG. 3 is a perspective view of the upper part of the printing apparatus, with its medium supplying section removed.

As may be seen from FIG. 3, the medium supplying section C is secured to the cassette-holding area 68 of the housing 2, and can be removed therefrom. The front part of the card cassette, which constitutes the medium supplying section C, has a rectangular opening (not shown). Through this opening, a sensor lever 69 provided on the housing of the printing apparatus 1 is inserted and abuts on the card Ca. It is thereby determined whether or not cards exist in the card cassette (or whether the medium supplying section C is secured to the housing of the printing apparatus 1).

If the medium supplying section C (i.e., card cassette) is removed from the cassette-holding area 68, an opening-closing member 66 located below the medium supplying section C will be seen from outside. The opening-closing member 66 has an upper cover 67, which constitutes a partition (i.e., bottom wall) that defines the cassette-holding area 68. The opening-closing member 66 is secured to the housing 2, and can rotate at one longitudinal end, to open and close. The printing apparatus 1 has, at its front, a front door 12 that can be opened and closed freely.

The medium supplying section C has such a configuration as disclosed in, for example, JP 2012-25511A. The opening-closing member 66 provided in the printing apparatus 1 has such a configuration as disclosed in, for example, JP 2012-123074A.

As shown in FIG. 4, a one-piece transmissive sensor SN24 having a light-emitting element and a light-receiving element is located downstream the card separating opening 7 in the card conveyance direction. Cleaning rollers 22 are arranged downstream the sensor SN24 in the card conveyance direction, to clean the card Ca delivered from the medium supplying section C and to convey the card Ca downstream. The cleaning rollers 22 are adhesive, and can remove dust or the like from the card Ca. Further, an adhesive roller 26 is pressed onto one of the cleaning rollers 22, to remove dust or the like from the cleaning rollers 22.

(3) Rotary Unit F

In brief, the rotary unit F has the function of changing the direction in which the medium is conveyed (in this embodiment, the function of conveying the card Ca and rotating the card Ca while holding an end of the card Ca). More specifically, the rotary unit F has a pair of disc-shaped rotary frames 50. (In FIG. 2, only the front-side rotary frame 50 is illustrated. The front-side rotary frame 50 shall hereinafter be distinguished from the rear-side rotary frame 50 not shown, when necessary.) The rotary frames 50 (provided in pair) are secured to a spacer (not shown), forming an integral member. The spacer defines a gap between the rotary frames 50.

(3-1) Card Conveyance

As shown in FIG. 4, the rotary unit F has two pairs of rollers, one pair composed of rollers 20, and the other pair composed of rollers 21. Of each pair, one roller is a driving roller and the other roller is a driven roller. The above-mentioned spacer functions as a guide member for guiding the card Ca nipped and being conveyed by the rollers 20 and rollers 21, at both sides (namely, obverse and reverse sides). The rollers 20 and 21 (each pair composed of a driving roller and a driven roller), and the shafts of the rollers 20 and 21 (i.e., four cylindrical members) are supported by the rotary frames 50 and can rotate. Two first gears (not shown) are mounted, respectively, on those ends of the shafts of the driving rollers of the rollers 20 and 21, which are close to the rotary frames 50. The first gears (not shown) mesh with two second gears (not shown) having a larger diameter than the first gears, respectively. The shafts of the second gears are rotatably supported by the rear-side rotary frame 50.

The second gears mesh with a third gear (not shown) having a smaller diameter than the second gears. The first gears, second gears and third gear are arranged inside the front-side rotary frame 50, almost parallel to the front-side rotary frame 50. The axis of the third gear extends through the rotation centers O (see FIG. 4) of the rotary unit F. The shaft of the third gear penetrates the rear-side rotary frame 50, and is supported rotatable by the rear-side rotary frame 50. The shaft of the third gear is rotatably secured, at its front end, to a plate-shaped rear-side frame member (not shown) which is secured to the housing 2 in almost vertical direction, which extends parallel to the rear-side rotary frame 50 and which is positioned outside the rear-side rotary frame 50 (or at the back thereof).

A fourth gear (not shown) having a larger diameter than the third gear is mounted on the shaft of the third gear. The fourth gear is positioned between the rear-side rotary frame 50 and the rear-side frame member, closer the rear-side frame member. The fourth gear meshes with a fifth gear (not shown) mounted on the shaft of a first card-conveyance motor (i.e., stepping motor that can rotate in both the forward direction and the reverse direction, not shown) that can be driven in both the forward direction and the reverse direction. The fifth gear has a smaller diameter than the fourth gear, and is positioned between the rear-side rotary frame 50 and the rear-side frame member, closer the rear-side frame member. That is, the first card-conveyance motor is secured to the back of the rear-side frame member, the shaft of the first card-conveyance motor penetrates the rear-side frame member, and the fifth gear is mounted on the front end of the shaft of the first card-conveyance motor.

On the front-upper part of the rear-side frame member (namely, the rear-side rotary frame 50 side), an unjamming dial (not shown) is provided. If the card Ca nipped between the rollers 20 and between the rollers 21 jams in the rotary unit F, disabling the rotary unit F from rotating, the operator manually rotates the rollers 20 and rollers 21 to take out the card Ca (namely, to perform unjamming). A gear is mounted on the shaft of the unjamming dial. This gear rotates if the operator rotates the unjamming dial. The rotation of the gear is transmitted to the above-mentioned fourth gear by some gears provided on the rear-side frame member. The fourth gear is therefore rotated, and rotates the rollers 20 and 21. As a result, the card Ca is delivered from the rotary unit F.

The first card-conveyance motor functions as a driver for the cleaning rollers 22, too. That is, the fourth gear transmits the drive force of the first card-conveyance motor via gears to the gear mounted on the shaft of the cleaning rollers 22. Thus, the first card-conveyance motor drives the cleaning rollers 22, rollers 20 and rollers 21, not only conveying the card Ca from the medium supplying section C to the rotary unit F (thus, rotary unit F receives the card Ca, see FIG. 4), but also conveying the card Ca from the rotary unit F to the information recording section A, medium conveyance path P1 or rejected-sheet stacker 54.

(3-2) Rotation

The front-side rotary frame 50 is rotatably secured to a plate-like front-side frame member. The front-side frame member is secured to the housing 2, extends almost in vertical direction, in parallel to the front-side rotary frame 50 and is positioned in front of the front-side rotary frame 50. (the front-side frame member is not shown in FIG. 2 because the front-side rotary frame 50 is not shown, either.) More specifically, a support shaft extends from the back of the front-side frame member toward the front-side rotary frame 50, and a hollow cylindrical bearing is provided at the center part of the front of the front-side rotary frame 50, and supports the support shaft.

The axis of the support shaft is positioned at the rotation center O (see FIG. 4) of the rotary unit F, and is arranged coaxial with the third gear. Therefore, the rotary unit F can rotate, since both rotary frames 50 are rotatably supported by the support shaft to the front-side frame member and the shaft of the third gear is rotatably supported by the rear-side frame member.

Two gears are formed on the circumferential surfaces of the front-side rotary frame 50 and rear-side rotary frame 50, respectively. These gears mesh with two sixth gears having a smaller diameter, respectively. The sixth gears are mounted on one gear shaft arranged below the front-side rotary fame 50 and the rear-side rotary frame 50. The gear shaft of the sixth gears is rotatably supported by the front-side rotary frame and rear-side rotary frame.

The sixth gear meshing with the gear formed on the circumferential surface of the rear-side rotary frame 50 meshes with a seventh gear (not shown) having a smaller diameter than the sixth gear and fitted on the shaft of a drive motor (i.e., stepping motor that can rotate in both the forward direction and the reverse direction, not shown). The drive motor is secured at the back of the rear-side frame member and located below the first card-conveyance motor described above. The shaft of the drive motor penetrates the rear-side frame member and has a seventh gear on its front end. Therefore, if the drive motor is driven, the card Ca held, at both edges, by the rollers 20 and 21 in the rotary unit F is rotated around the rotation center O of the rotary unit F (see FIG. 5).

When the drive motor rotates the rotary unit F, the shafts of the rollers 20 and the shafts of the rollers 21 rotate, too, because these shafts are rotatably supported by the rotary frames 50. (This phenomenon is called "simultaneous rotation.") In this embodiment, in order to rotate the card Ca nipped, at one end by the rollers 20 and at the other end by the rollers 21, the first card-conveyance motor is driven in the direction reverse to the direction the rotary unit F has been rotated, by the same angle as the first card-conveyance motor has been driven. The simultaneous rotation is thereby prevented.

First and second cylindrical members are formed on the front-side rotary frame 50 and extend toward the front side. The first cylindrical member protrudes from the circumferential surface of the front-side rotary frame 50. The second cylindrical member is concentric with the first cylindrical member (with respect to the rotation center O), and protrudes forwards from that part of the front-side rotary frame 50, which has a smaller diameter than the first cylindrical member. The first and second cylindrical members have a notch each. First and second phase sensors (not shown) may detect the notches, to detect the phase of the rotary unit F (more precisely, rotary frames 50).

The notch of the first cylindrical member is cut in accordance with the position (or direction) of the notch cut in the second cylindrical member and with the directions of the sensors arranged around the rotary unit F. The notch of the second cylindrical member is cut in accordance with the positions of the rollers 20 and 21 (more precisely, the shafts of rollers 20 and 21). The first phase sensor functions as encoder for driving the drive motor that rotates the rotary unit F, and the second phase sensor functions as encoder for setting the rotary unit F (more precisely, the rollers 20 and 21) at the initial position.

(3-3) Positions of the Sensors

Sensors are arranged around the rotary unit F. As shown in FIG. 4, a sensor SN2 is arranged between the rollers 20 and the cleaning rollers 22, to detect the rear end of the card Ca being conveyed from the medium supplying section C. A sensor SN 26 is arranged downstream the rollers 21 in the card conveyance direction, to detect the front end of the card Ca being conveyed.

As described above, the magnetic recording unit 24, noncontact IC recording unit 23 and contact IC recording unit 27, which constitute the information recording section A, are arranged around the rotary unit F (see FIG. 2). As shown in FIG. 4, sensors SN4 and SN5 and the aforementioned sensor SN26 are arranged to detect the ends of the card Ca. Further, a sensor SN23 is arranged in the direction of the rejected-sheet stacker 54 (namely, in the direction of delivering erroneously fed cards), and a sensor SN3 is arranged in the direction of the printing section B (more precisely, transfer unit B2, namely in the direction of medium conveyance path P1 (described in detail, later). Like the sensor SN24, the sensors SN3, SN4, SN5 and SN23 are one-piece transmissive sensors each having a light-emitting element and a light-receiving element.

In this embodiment, the line connecting the rotation center O to the sensing positions (i.e., dots in FIG. 4) of the sensors SN2 and SN24 is at angle of 10° to the vertical line (i.e., solid line shown in FIG. 4, namely, reference line at angle 0°); the line connecting the rotation center O to the sensing position of the sensor SN23 is at angle of 125° to the reference line; the line connecting the rotation center O to the sensing position of the sensor SN4 is at angle of 173° to the reference line; the line connecting the rotation center O to the sensing position of the sensor SN26 is at angle of 190° to the reference line; the line connecting the rotation center O to the sensing position of the sensor SN3 is at angle of 270° to the reference line, and the line connecting the rotation center O to the sensing position of the sensor SN5 is at angle of 305° to the reference line.

Thus, the rotary unit F (the pair of rollers 20 and the pair of rollers 21) has the function of forming a medium conveyance path 65 (see FIG. 2) for conveying the card Ca in one of these directions. That is, the rotary unit F has the function of changing the direction of conveying the card Ca. FIG. 4 illustrates the rotary unit F positioned to receive the card Ca. In this state, the rollers 20 and rollers 21 are positioned, together with the sensor SN24, cleaning rollers 22 and sensors SN2 and SN26 (both at sensing positions), in the medium conveyance path P0 substantially linear (inclined at 10° to the vertical line, i.e., solid line shown in FIG. 4). The medium conveyance path 65 makes a part of the medium conveyance path P0. On the outer circumference of the rotary unit F, a temperature sensor Th (e.g., thermistor) is arranged to detect the ambient temperature, i.e., outside temperature (see FIG. 2). Based on the ambient temperature detected by the temperature sensor Th, the heating element of a thermal head (later described) and a heating roller (later described) provided in the printing section B are controlled.

(3-4) Distances Between the Rotation Center and Each Sensor

Figure 5:
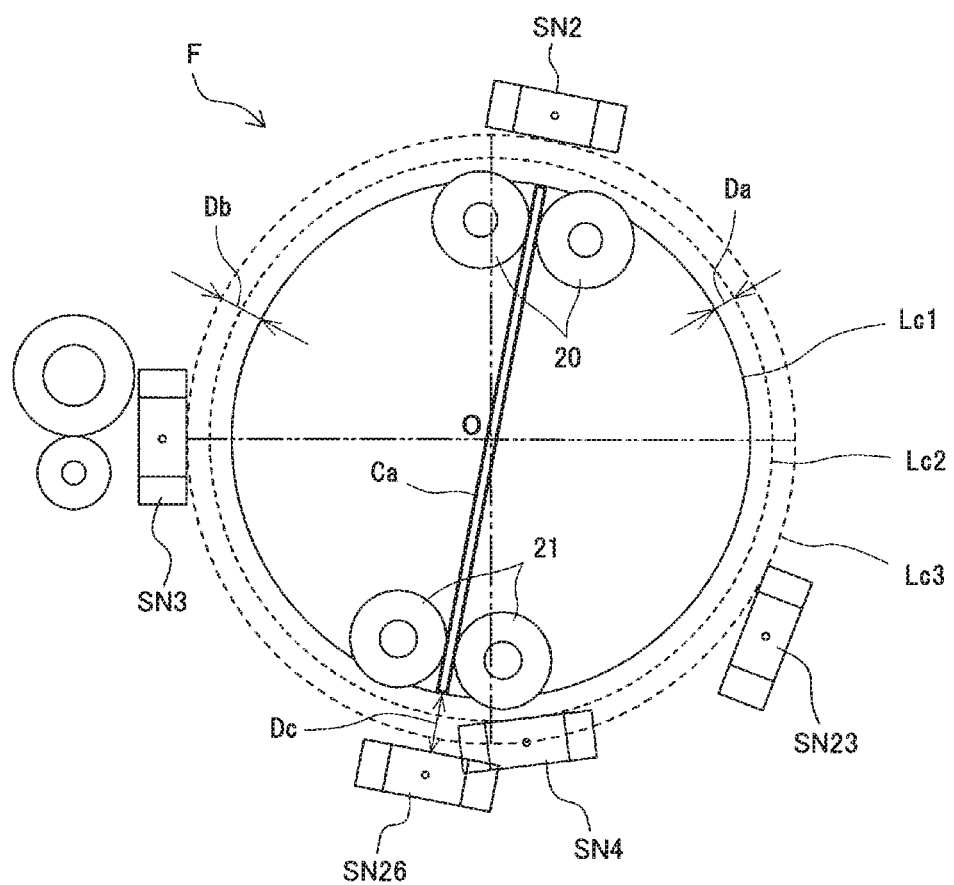
FIG. 5 is a diagram schematically showing the distances from the rotation center of the rotary unit to the sensors.

FIG. 5 schematically shows the distances from the rotation center O of the rotary unit to the sensors. To facilitate the understanding, FIG. 5 shows one standard-size card Ca normally conveyed to the rotary unit F, with its center part located at the rotation center O and with its one end nipped by the rollers 20 and its other end nipped by the rollers 21.

As described above, the card Ca of the standard-size has a length of 85.6 mm. Therefore, the distance from the rotation center O to the first locus Lc1 (i.e., locus of the card end) is 42.8 mm, i.e., half the length of the card Ca; the distance Da between the first locus Lc1 and the second locus Lc2 (i.e., the circle around the rotation center O and contacting the frame of the sensor SN4) is 7.0 mm; the distance Db between the first locus Lc1 and the third locus Lc3 (i.e., the circle around the rotation center O and contacting the frames of the sensors SN2, SN3 and SN23) is 8.0 mm; and the distance Dc between the first locus Lc1 and the sensor SN26 is 12.0 mm. The sensing positions of the sensors SN2 and SN26 are located still farther by 0.7 m from the rotation center O.

Therefore, the linear distance between the sensing position of the sensor SN2 for detecting the rear end of the card Ca and the sensing position of the sensor SN26 for detecting the front end of the card Ca is the length of card Ca (85.6 mm)+{distance Db (8 mm)+distance (0.7 mm) from the sensor frame of sensor SN2 to the sensing position thereof}+{distance Dc (12.0 mm)+distance (0.7 mm) from the sensor frame of sensor SN26 to the sensing position thereof}=107 mm.

The sensing position of the sensor SN23 exists at the distance of 9.7 mm from the first locus Lc1 and at the distance of 52.5 mm from the rotation center O. In FIG. 5, the sensor SN5 (shown FIG. 4) is not illustrated, but its sensor frame contacts the third locus Lc3 as the sensor frame of the sensor SN3 does.

(4) Printing Section B

The printing section B is configured to form portrait and character data on both sides of the card Ca. As shown in FIG. 2, it has a medium conveyance path P1 which extends almost horizontal to convey the card Ca from the medium conveyance path 65. At the medium conveyance path P1, a pair of conveyance rollers 29 and a pair of conveyance rollers 30 are provided to convey the card Ca. The conveyance rollers 29 and the conveyance rollers 30 are connected by gears or the like (not shown) to a second card-conveyance motor (i.e., stepping motor that can rotate in both the forward direction and the reverse direction, not shown).

The printing section B has a film conveyance mechanism 10, and includes an image forming unit B1 and a transfer unit B2. In the image forming unit B1, a thermal head 40 uses an ink ribbon 41, forming images of different colors, one on another, in the image forming region of a transfer film 46 which is conveyed by way of the film conveyance mechanism 10. In the transfer unit B2, a heat roller 33 transfers the images from the transfer film 46 to one side of the card Ca on the medium conveyance path P1.

The printing section B will be described in detail with reference to FIG. 2. The transfer film 46 is shaped like a band having a width greater than the width of the card Ca. The transfer film 46 is composed of an ink-receiving layer for receiving ink from the ink ribbon 41, a transparent protection film for protecting the surface of the ink-receiving layer, a peel layer for peeling the ink-receiving layer and the protection film together when it is heated, and a base (i.e., base film). The ink-receiving layer, transparent protection film, peel layer and base are laid one on another in the order mentioned.

The transfer film 46 used in this embodiment has marks for setting image-forming start positions that are formed at regular intervals so as to cross the widthwise direction (i.e., main scanning direction of the thermal head 40) intersecting with the printing direction (i.e., sub-scanning direction of the thermal head 40). The spaces between these marks are image forming regions.

The transfer film 46 is fed from a supply roll 47 and taken up by a take-up roller 48, as motors Mr2 and Mr4 are driven in the transfer film cassette. In the transfer film cassette, the supply roll 47 and the take-up roller 48 are mounted on a supply spool 47A and a take-up spool 48A, respectively. The supply spool 47A receives the drive force of the motor Mr2 through a gear (not shown), and the take-up spool 48A receives the drive force of the motor Mr4 through a gear (not shown). The motor Mr2 and the motor Mr4 are DC motors that can rotate in both the forward direction and the reverse direction.

In this embodiment, the transfer film 46 is wound around the supply spool 47A, and the used transfer film 46 (i.e., that part of film 46, which has been used in the transfer unit B2) is wound around the take-up spool 48A. To form an image on the transfer film 46 and to transfer the image from the transfer film 46, the transfer film 46 is once fed from the supply spool 47A to the take-up spool 48A and is taken up around the supply spool 47A.

A film conveyance roller 49 is a drive roller important for conveying the transfer film 46. The driving of the film conveyance roller 49 is controlled, determining the distance for which the transfer film 46 is conveyed and the position at which the transfer film 46 is stopped. The film conveyance roller 49 is connected to a film conveyance motor Mr5 (i.e., stepping motor) which can be driven in both the forward and the reverse direction. When the film conveyance roller 49 is driven, the motors Mr2 and Mr4 are driven, too, one feeding the transfer film and the other taking up the film, thereby applying a tension to the transfer film 46. Thus, the motors Mr2 and Mr4 perform an auxiliary function of conveying the transfer film.

At the circumferential surface of the film conveyance roller 49, pinch rollers 32a and 32b are arranged. The pinch rollers 32a and 32b can move toward and away from the film conveyance roller 49. As shown in FIG. 2, the pinch rollers 32a and 32b move to the film conveyance roller 49, holding a part of the transfer film 46 around the film conveyance roller 49. The transfer film 46 can therefore be correctly conveyed by the distance proportional to the number of times the film conveyance roller 49 rotates.

The film conveyance mechanism 10 thus conveys the transfer film 46 back and forth between the supply roll 47, image forming unit B1, transfer unit B2 and take-up roller 48, as the film conveyance roller 49 (i.e., main drive roller) arranged between the image forming unit B1 and the transfer unit B2 is rotated. The film conveyance mechanism 10 correctly positions the image-forming region of the transfer film 46 and the image formed in the image-forming region in the image forming unit B1 and transfer unit B2, thereby achieving so-called "cueing." A sensor Set having a light-emitting element and a light-receiving element and configured to detect the marks formed on the transfer film is arranged between the take-up roller 48 and the image forming unit B1 (having thermal head 40 and platen roller 45).

The ink ribbon 41 is stored in a ribbon cassette 42. In the ribbon cassette 42, the ink ribbon 41 is fed from a supply roll 43 to a take-up roll 44. The supply roll 43 is mounted on the supply spool 43A, and the take-up roll 44 is mounted on the take-up spool 44A. The take-up spool 44A is rotated by a motor Mr1 and the supply spool 43A is rotated by a motor Mr3. The motor Mr1 and the motor Mr3 are DC motors that can rotate in both the forward direction and the reverse direction.

The ink ribbon 41 is composed of Y (yellow), M (magenta), C (cyan) and Bk (black) ribbon panels repeatedly arranged in the lengthwise direction. Between the supply roll 43 and the image forming unit B1 (having thermal head 40 and platen roller 45), a sensor Se2 is arranged. The sensor Se2 has a light-emitting element and a light-receiving element, and detects the position of the rink ribbon 41 when any Bk ribbon panel blocks the light beam emitted from the light-emitting element toward the light-receiving element, thereby cuing of the ink ribbon 41 in the image forming unit B1.

The platen roller 45 and the thermal head 40 constitute the image forming unit B1. The thermal head 40 is positioned, opposing the platen roller 45. To form an image, the platen roller 45 is pressed to the thermal head 40, with the transfer film 46 and rink ribbon 41 interposed between it and the thermal head 40. The thermal head 40 has a plurality of heating elements juxtaposed in the main scanning direction. The heating elements are selectively heated by a head control IC (not shown) in accordance with print data, and form an image on the transfer film 46 by using the ink ribbon 41. Note that a cooling fan 39 is used to cool the thermal head 40.

After the image is formed on the transfer film 46, a peeling roller 25 and a peeling member 28 peel the ink ribbon 41 from the transfer film 46. The peeling member 28 is secured to the ribbon cassette 42. The peeling roller 25 abuts on the peeling member 28 at the time of forming an image. The peeling roller 25 and the peeling member 28 clamp the transfer film 46 and the ink ribbon 41 together, peeling the ink ribbon 41 from the transfer film 46. The ink ribbon 41 so peeled is taken up around the take-up roll 44 driven by the motor Mr1. The transfer film 46 is conveyed by the film conveyance mechanism 10 to the transfer unit B2 having a platen roller 31 and a heat roller 33.

Downstream the film conveyance roller 49, a sensor Se3 is arranged to detect the marks formed on the transfer film 46. When the sensor Se3 detects the marks, the card Ca nipped by the conveyance rollers 29 and conveyance rollers 30 on the medium conveyance path P1 and thereby stopped (or kept waiting) is conveyed again toward the transfer unit B2. The card Ca and the image-forming region of the transfer film 46 therefore reach the transfer unit B2 at the same time. Note that the sensor Se3 is a one-piece transmissive sensor having a light-emitting element and a light-receiving element.

In the transfer unit B2, the transfer film 46 is clamped, together with the card Ca, between the heat roller 33 and the platen roller 31. Therefore, the image is transferred from the image-forming region of the transfer film 46 to one side of the card Ca. That is, the heat roller 33 is pressed to the platen roller 31, with the card Ca and the transfer film 46 (i.e., image-forming region) clamped between it and the platen roller 31, and the card Ca and the transfer film 46 are conveyed at the same speed and in the same direction. The heat roller 33 is secured to a lift mechanism (not shown), and can contact and leave the platen roller 31 with the transfer film 46 interposed between it and the platen roller 31.

The transfer film 46 is separated (or peeled) from the card Ca by a peeling pin 79 arranged between the heat roller 33 and a driven roller (i.e., downstream roller, see FIG. 2), which constitute a conveyance roller pair 37. The transfer film 46 from which the image has been transferred is then conveyed to the supply roll 47. Meanwhile, the card Ca to which the image has been transferred is conveyed in a medium conveyance path P2 toward the de-curling mechanism G positioned downstream.

As described above, the ink ribbon 41 is designed for color printing, composed of Y, M, C and Bk ribbon panels repeatedly arranged. Instead, a monochrome ink ribbon composed of Bk ribbon panels only can be used in the printing apparatus 1 according to the embodiment. If the monochrome ink ribbon is used, a monochrome image will be printed on the card Ca.

(5) De-Curling Mechanism G

As shown in FIG. 2, a substantially horizontal medium conveyance path P2 is provided downstream the transfer unit B2 and extends from the medium conveyance path P1 to convey the card Ca (already printed) to a stacker 60. At the medium conveyance path P2, a pair of conveyance rollers 37 and a pair of conveyance rollers 38 are arranged to convey the card Ca. The conveyance roller pairs 37 and 38 are connected to second card conveyance motors described above via gears (not shown). The roller pairs 29, 30, 37 and 38 (and the platen roller 31) arranged in the medium conveyance paths P1 and P2 are rotated by the second card conveyance motors.

The conveyance rollers 37 and the conveyance rollers 38 constitute a part of the de-curling mechanism G. The de-curling mechanism G has a de-curling unit 34. The de-curling unit 34 is shaped convex and pushes down the center part of the card Ca nipped at both ends by the conveyance rollers 37 and the conveyance rollers 38, thereby clamping the card Ca and straightening up the card Ca curled due to the heat the heat roller 33 has applied to it during the thermal transfer. The de-curling mechanism G includes an eccentric cam 36 which can move the de-curling unit 34 up and down as shown in FIG. 2.

(6) Medium Storing Section D

The medium storing section D has a stacker 60 configured to store the card Ca conveyed from the de-curling mechanism G. The stacker 60 can be moved down by a lift mechanism 61 as may be seen from FIG. 2.

1-2-2 Control Section and Power Supply Section

The printing apparatus 1 includes a control section and a power supply section, which will now be described. As shown in FIG. 6, the printing apparatus 1 has a control section 70 and a power supply section 80. The control section 70 controls all operations in the printing apparatus 1. The power supply section 80 converts the commercially available AC power to DC power that can drive/operate the mechanical units and the control units of the printing apparatus 1.

(1) Control Section

As shown in FIG. 6, the control section 70 has a microcomputer unit 72 (hereinafter abbreviated as "MCU 72") for carrying out overall control of the printing apparatus 1. The MCU 72 is composed of a CPU that operates as central processing unit at high clock speed, a ROM storing the programs and program data that for the printing apparatus 1, a RAM operating as work area of the CPU, and an internal bus connecting the CPU, ROM and RAM.

An external bus is connected to the MCU 72. A communications unit 71 and a memory 77 are connected to the external bus. The communications unit 71 has a communications IC and communicates with the host apparatus 101. The memory 77 temporarily stores the print data for forming an image on the card Ca and the record data that should be magnetically or electrically recorded in the magnetic stripe or internal IC of the card Ca.

To the external bus, a signal processing unit 73, an actuator control unit 74, a thermal head control unit 75, an operation display control unit 76, a buzzer operating circuit 78, and the above-mentioned information recording section A are connected. The signal processing unit 73 processes signals coming from the various sensors described above. The actuator control unit 74 includes a motor driver configured to drive pulses and drive power to the motors. The thermal head control unit 75 controls the thermal energy supplied to the heating elements constituting the thermal head 40. The operation display control unit 76 controls the operation panel unit 5. The buzzer operating circuit 78 operates a buzzer 6 if cards Ca are multi-fed, one overlapping another.

(2) Power Supply Section

The power supply section 80 supplies operation/drive power to the control section 70, thermal head 40, heat roller 33, operation panel unit 5, information recording section A and the like.

2. Operation

Hereinafter, it will be explained how the printing apparatus 1 according to this embodiment operates, mainly how the CPU of the MCU 72 (hereinafter called "CPU") operates.

When power is supplied to the printing apparatus 1, each component of the printing apparatus 1 is set at home (initial) position (as shown in, for example, FIG. 2), and the programs and program data stored in the ROM are initialized in the RAM.

When the CPU receives the print instructions from the operation panel unit 5 (more precisely, operation display control unit 76) or through the communications unit 71, it executes the card issuing routine shown in FIG. 7. To simplify the explanation, it is assumed that the CPU has received, from the host apparatus 101, the print data (composed of Bk print data and Y, M and C color-component print data) and electric and magnetic record data and has stored the print data (for one-side printing or double-side printing) and the record data into the memory 77. The operations of the printing section B (i.e., image forming unit B1 and transfer unit B2) have been explained above, and will be briefly described below, avoiding repetitive explanations.

2-1. Printing on One Side of the Card

As shown in FIG. 7, in step S202 of the card issuing routine, the image forming unit B1 performs a primary transfer process (i.e., image forming process) of forming an image (mirror image) on one side (e.g., obverse side) of the transfer film 46. That is, the thermal head 40 of the image forming unit B1 is controlled in accordance with the Y, M and C print data and the Bk print data stored in the memory 77. A Y ink image, an M ink image, a C ink image and a Bk ink image are thereby formed, one overlapping another, in the image forming region of the transfer film 46.

As the primary transfer is performed in Step S202, the CPU performs the card supplying process. The card supplying process includes (1) a card supplying process of feeding the card Ca from the medium supplying section C and conveying the card Ca to the information recording section A, (2) a process of recording electric or magnetic record data on a card Ca or cards Ca in the information recording section A, and (3) a conveying process of conveying the record-processed card Ca toward the medium conveyance path P1 (having conveyance rollers 29 and conveyance rollers 30).

(1) Card Supplying Process (1-1) Rotation Toward Card-Receiving Direction

Figure 8A:
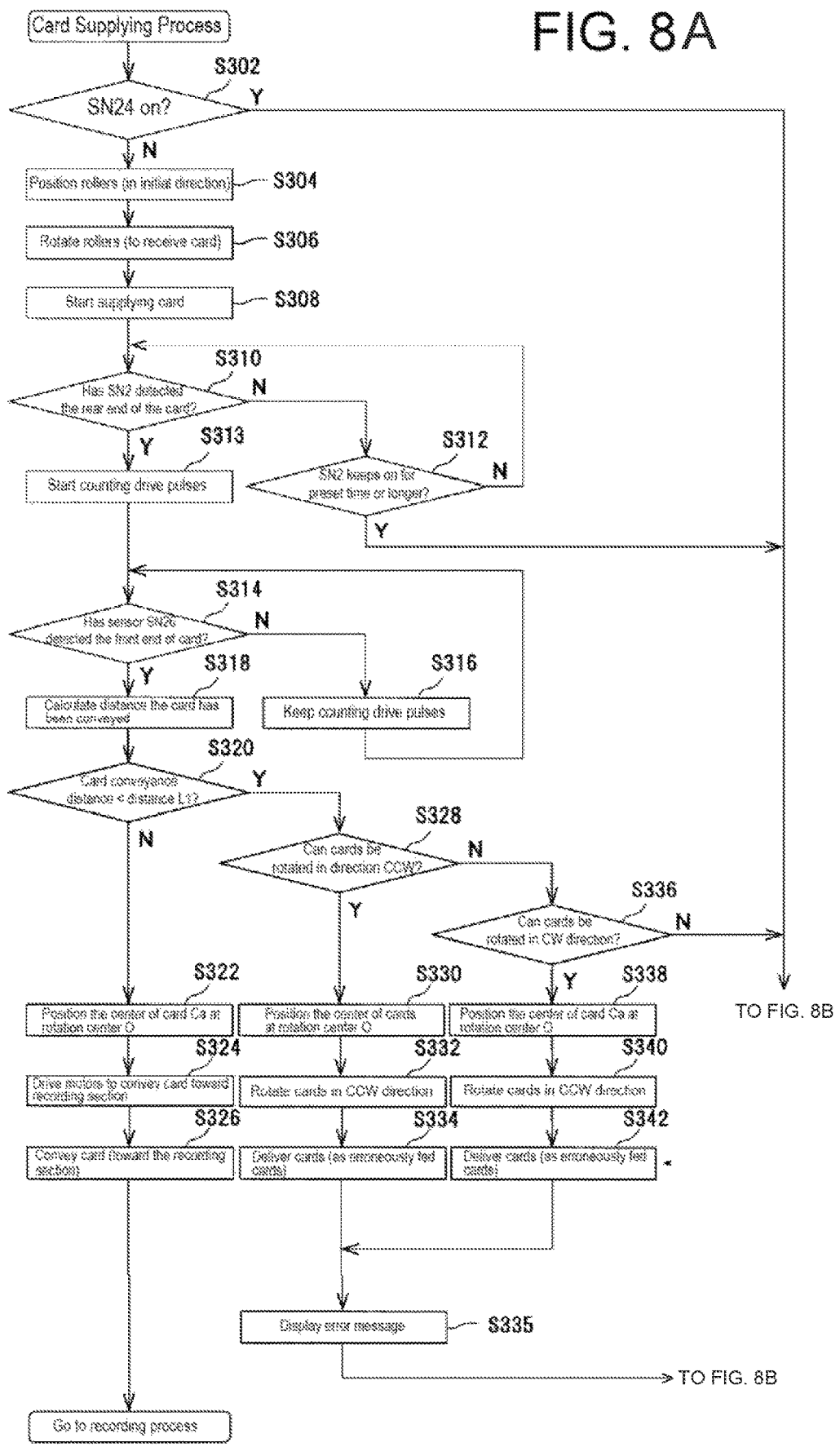
FIGS. 8A and 8B are flowcharts showing the card supplying process subroutine that is a part of the card issuing routine.
Figure 8B:
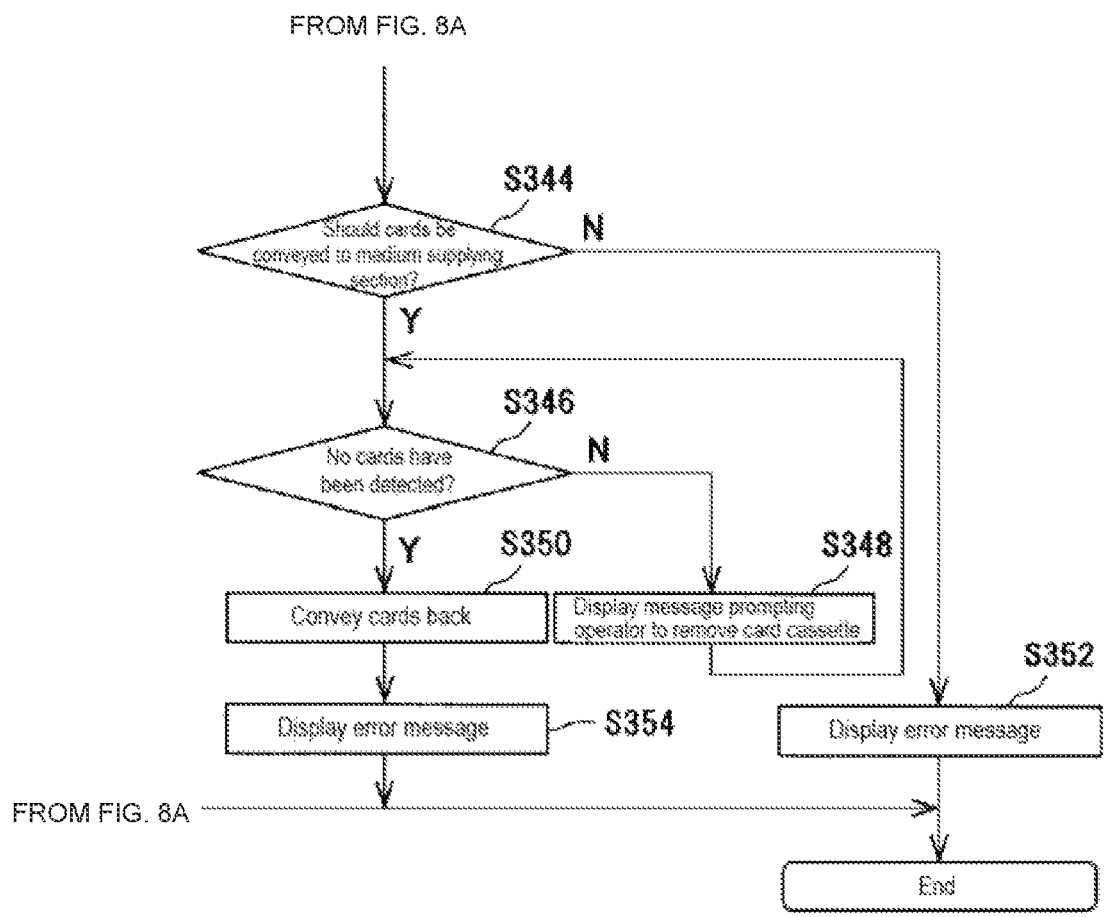

FIGS. 8A and 8B are flowcharts illustrating the card supplying process subroutine. In the card supplying process subroutine, it is determined in Step S392 whether the sensor SN24 is on (enabled to detect a card). As shown in FIG. 4, in the medium supplying section C, cards Ca are stored and aligned in standing position. An unskilled operator may push, from above, the foremost card Ca in the medium supplying section C. If the sensor SN24 is on in this case or in any other case, something is considered existing in the sensor SN24.

If Yes in Step S302, the process jumps to Step S344. If No in Step S202, the process goes to Step S304. In Step S304, the actuator control unit 74 drives the drive motor in accordance with the output of the second phase sensor (described above), thereby positioning the rollers 20 and rollers 21 constituting the rotary unit F, in the initial direction. In this embodiment, the rollers 20 and the rollers 21 are arranged, extending in the horizontal direction (namely, in the state shown in FIG. 2).

Next, in Step S306, the drive motor is driven, positioning the rollers 20 and rollers 21 constituting the rotary unit F in such a direction as to receive the card. This direction is set at 10° around the rotation center O, from the vertical line (i.e., solid line) shown in FIG. 4. Hence, in Step S306, the rollers 20 and rollers 21 at their initial positions in Step 304, namely at 90° from the vertical line shown in FIG. 4, are rotated by 80° in the counterclockwise direction (CCW).

(1-2) Feeding of the Card

In the next step S308, the actuator control unit 74 drives a pickup motor and a first card-conveyance motor. As the pickup motor is driven, the front-most card Ca in the medium supplying section C is fed from the medium supplying section C and conveyed toward the rotary unit F via the cleaning rollers 22 as the pickup roller 19 is being rotated. The pickup motor stops rotating after the sensor SN24 detects the rear end of the card Ca. However, the first card-conveyance motor is kept driven (and keeps rotating the cleaning rollers 22, rollers 20 and rollers 21) even after the pickup motor stops rotating in order to convey the card Ca to the rotary unit F.

(1-3) Detection of the Card Ends

Then, in Step S310, it is determined whether the sensor SN2 has detected the rear end of the card Ca being conveyed. If No, it is determined, in Step S312, whether the sensor SN2 keeps on for a preset period of time or longer after the sensor SN2 detects the front end of the card Ca (namely, whether the card Ca has been conveyed longer than a preset distance). This can be determined, for example, first by counting the drive pulses output from the actuator control unit 74 to the first card-conveyance motor from the time when the sensor SN2 detects the front end of the card Ca, and then by determining whether the number of drive pulses counted has reached a prescribed value.

In this embodiment, if the number of drive pulses required to convey the card Ca for 113.6 mm (=85.6 mm (length of card Ca)+28.0 mm (threshold value for conveying of multi-fed cards) is counted from the time when the sensor SN2 detects the front end of the card Ca, it is determined in Step S312 that two or more cards Ca have been multi-fed (namely, Yes in Step S312). In this case, the process goes to Step S344. If No in Step S312, the process then returns to Step S310 to continue the conveyance of the card Ca.

Figure 9A:
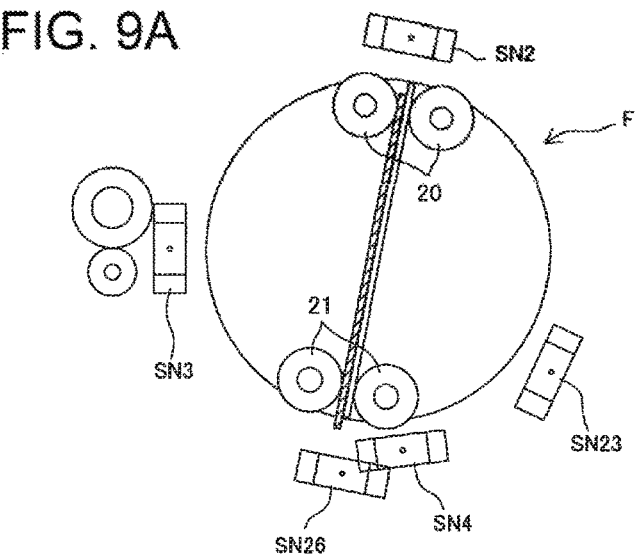
FIGS. 9A, 9B and 9C are diagrams schematically explaining how multi-fed cards are conveyed to the rotary unit.

If Yes in Step S310, the counting of the drive pulses output from the actuator control unit 74 to the first card-conveyance motor is started in Step S313. FIG. 9A shows two cards received together in the rotary unit F (i.e., rollers 20 and rollers 21) after the counting of the drive pulses is started in Step S313.

Figure 9B:
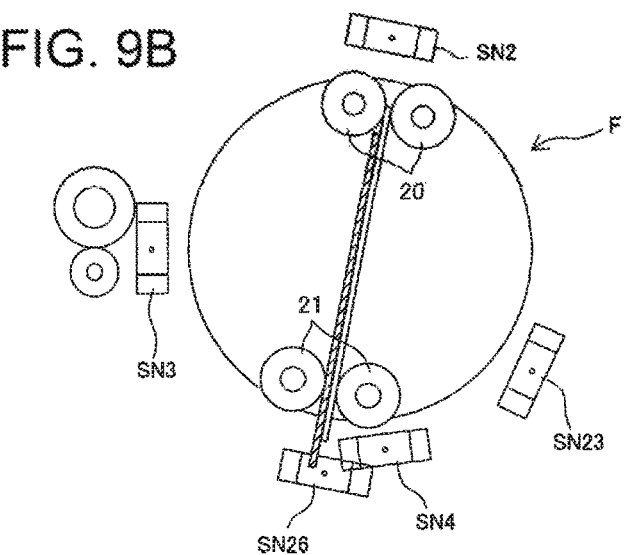

In the next Step S314, it is determined whether the sensor SN26 has detected the front end of the card Ca being conveyed. If No, the drive pulses output from the actuator control unit 74 to the first card-conveyance motor are continuously counted in Step S316, and the process returns to Step S314. If Yes in Step S314, the process goes to Step S318, in which the first card-conveyance motor is stopped and the counting of the drive pulses is also stopped, and distance Ld the card has been conveyed is calculated. FIG. 9B shows two cards conveyed together, with their front ends detected by the sensor SN26.

(1-4) Determining Multi-Feeding

Figure 13:
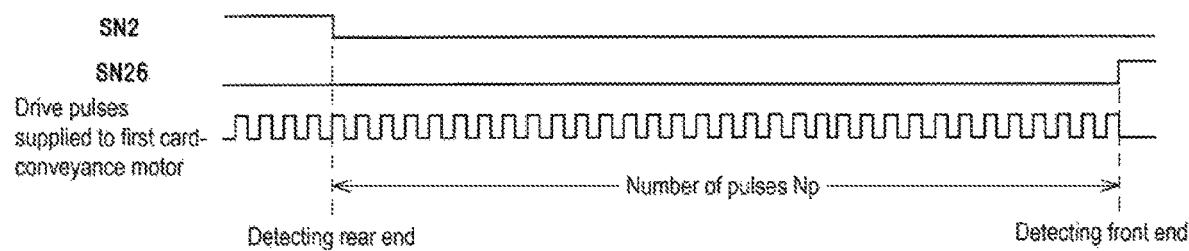
FIG. 13 is a timing chart illustrating the relation between the output of the sensor for detecting the front end of a card, the output of the sensor for detecting the rear end of the card, and the drive pulses supplied to the first card-conveyance motor.

FIG. 13 illustrates the relation between the output of the sensor SM2 for detecting the front end of a card Ca, the output of the sensor SN26 for detecting the rear end of the card Ca, and the drive pulses supplied from the actuator control unit 74 to the first card-conveyance motor. The number of drive pluses counted in Step S318 reaches value Np (see FIG. 13). The first card-conveyance motor is a stepping motor (i.e., pulse motor) and conveys the card Ca for a predetermined distance in response to one pulse.

Hence, the distance Ld the card is conveyed can be determined from the number of pulses Np supplied to the first card-conveyance motor.

As has been explained with reference to FIG. 5, the sensing position of the sensor SN2 is at a linear distance of 107 mm from the sensing position of the sensor SN26. As specified above, the standard length of the card Ca is 85.6 mm. The card Ca is therefore conveyed for 21.4 mm (=107 mm−85.6 mm), from the time when its rear end is detected by the sensor SN2 to the time when its front end is detected by the sensor S26.

As shown in FIG. 9B, two cards may be multi-fed. In this case, the distance between the front end of the preceding card and the rear end of the following card is longer than the length of a standard-size card Ca. The front end of the preceding card therefore reaches the sensor SN26 earlier than the front end of a card Ca normally conveyed. The distance Ld the multi-fed cards are conveyed from the time when the sensor SN2 detects the rear end of the following card to the time when the sensor SN26 detects the front end of the preceding card therefore becomes shorter. Hence, if a reference number of pulses (i.e., pulses that must be supplied to the first card-conveyance motor to move a card Ca for distance of 21.4 mm) is preset as shown in FIG. 13, distance Ld the multi-fed cards are conveyed can be determined from the number by which the pulses actually supplied are fewer than the reference number can be found.

Table 1 set forth below shows the relation between the card conveyance distance Ld, card length Lc, difference Ds between the card length and the standard card length (85.6 mm), and the rotation/non-rotation state of the cards nipped by the rollers 20 and rollers 22. In this embodiment, the card has a length allowance of ±1 mm with respect to the standard length, in consideration of expansion and contraction of the card Ca ascribable to the installation error of the sensors and the changes of the ambient temperature.

TABLE 1

|  | Card Conveyance Distance Ld [mm] | Card Length Lc [mm] | Difference Ds [mm] | Rotation/Non-rotation |
|---|---|---|---|---|
| Normal | 20.4 ≤ Ld ≤ 22.4 | 84.6 ≤ Lc ≤ 86.6 | −1.0 ≤ Ds ≤ 1.0 | Rotatable in CW and CCW directions |
| Multi-Feed Conveyance | 8.4 ≤ Ld < 20.4 | 86.6 < Lc ≤ 98.6 | 1.0 < Ds ≤ 12.0 | Rotatable in CW and CCW directions |
|  | 6.4 ≤ Ld < 8.4 | 98.6 < Lc ≤ 100.6 | 12.0 < Ds ≤ 14.0 | Rotatable in CW direction only |
|  | Ld < 6.4 | Lc > 100.6 | Ds > 14.0 | Not rotatable |

In the next Step S320, it is determined whether the card conveyance distance Ld is shorter than the preset distance L1. The preset distance L1 is 20.4 mm (see Table 1). The card conveyance distance Ld for which a card Ca is normally conveyed, without overlapping any other, is 21.4 mm. In view of the length allowance of ±1 mm specified above, the lower and upper limits of the card conveyance distance Ld are 20.4 mm and 22.4 mm, respectively. Hence, the CPU determines that the card Ca is normally conveyed, not together with any other card, if 20.4 mm≤card conveyance distance Ld≤22.4 mm.

In Step S320 it is determined whether the card conveyance distance Ld is shorter than the lower limit (L1=20.4 mm) only, because the rollers 20 and the rollers 21 may slip with respect to the card Ca. Instead, it may be determined whether the card conveyance distance Ld is shorter than the upper limit of 22.4 mm. In this case, the card supplying process subroutine need not be terminated because of the multi-feeding of cards. If the card conveyance distance Ld is, for example, longer than 22.4 mm, the operation panel unit 5 may display a message prompting the operator to clean the conveyance rollers 20 and the conveyance rollers 21.

If No in Step S320 (namely, card conveyance distance Ld 20.4 mm), the card Ca is normally conveyed, not overlapping any other card. The process therefore goes to Step S322. In Step S322, the first card-conveyance motor is driven in the reverse direction in accordance with the card conveyance distance Ld, thereby positioning the center part of the card Ca at the rotation center O. (As a result, the distance between the center part of the card Ca and the nip of the conveyance rollers 20 becomes equal to the distance between the center part of the card Ca and the nip of the conveyance rollers 21.) Then, the first card-conveyance motor is stopped. This state is illustrated in FIG. 5.

In the next Step S324, the actuator control unit 74 drives the drive motor to convey the card Ca toward the desired information recording section A. (To make the rotary unit F hold the card Ca and then rotate, the first card-conveyance motor is driven, too, preventing the aforementioned simultaneous rotation.) At this point, in order to record information on the obverse or reverse side, or both sides of the card Ca in the information recording section A (e.g., noncontact IC recording unit 23), the first card-conveyance motor is driven in the direction (e.g., counterclockwise direction) for a shorter time than it must be driven in the other direction. Then, in Step S326, the first card-conveyance motor is driven in the forward or reverse direction, conveying the card Ca toward the information recording section A as desired, thereby completing the card supplying process subroutine. The recording process (described later) is then performed.

If Yes in Step S320 (if card conveyance distance Ld<20.4 mm), it is determined that cards are multi-fed (or that a card of irregular size is mixed). In this case, a process is performed to reduce, as much as possible, the operator's labor in unjamming the printing section B (thereby to enhance the unjamming efficiency). (This process is also performed if Yes in Step S302 or in Step S312.) In this embodiment, any multi-fed cards are ejected in the direction toward the rejected-sheet stacker 54 (i.e., along line connecting the rotation center O and the sensing position of the sensor SN23).

(1-5) Rotation of the Multi-Fed Cards, and Delivery of the Multi-Fed Cards

As explained with reference to FIG. 5, the distance Da between the first locus Lc1 and the second locus Lc2 is 7.0 mm, and the distance Db between the first locus Lc1 and the third locus Lc3 is 8.0 mm. If the centers of the multi-fed cards are positioned at the rotation center O, the multi-fed cards can theoretically be rotated clockwise (CW) or counterclockwise (CCW) from the card-receiving direction, without interfering with, for example, the sensor SN4, until one end of each card extends 7 mm (namely, until both ends extend 14 mm in total) beyond the first locus Lc1 (that is, as long as both ends of each multi-fed card lie within the second locus Lc2). Therefore, the cards can be positioned in the direction of the rejected-sheet stacker 54. Even if both ends of each card extend 14 mm or more, the multi-fed cards can be rotated in the CW direction from the position where they have been received, can be positioned in the direction of the rejected-sheet stacker 54, until one end of each card extends 8 mm (namely, until both ends extend 16 mm in total) beyond the first locus Lc1.

Figure 11A:
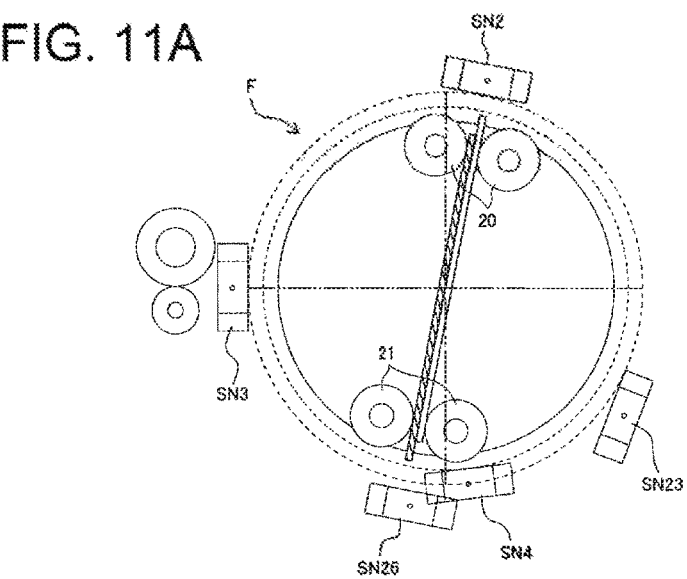
FIGS. 11A to 11C are diagrams schematically showing the direction in which the rotary unit rotates with respect to the multi-fed cards.
Figure 11B:
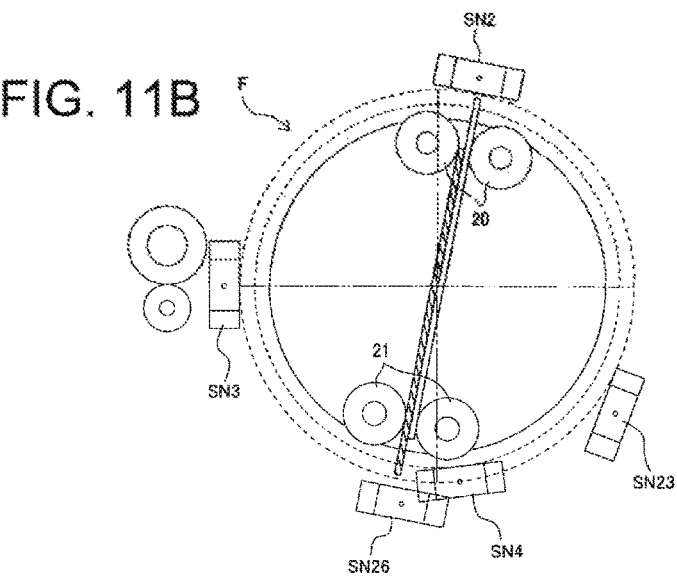
Figure 11C:
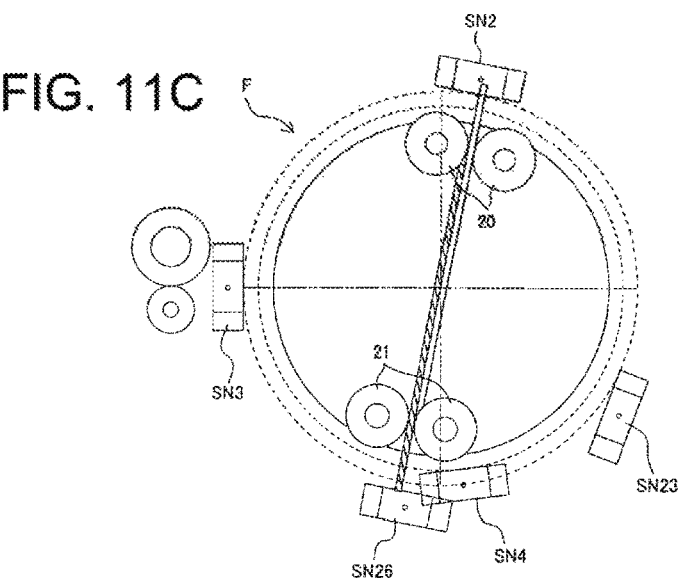

As specified above, allowance of ±1 mm is set in consideration of the error in arranging the sensors. Therefore, the CPU determines, as shown in Table 1, that the multi-fed cards can rotate clockwise (CW) and counterclockwise (CCW) until their ends extend 12 mm, in total, from the first locus Lc1 (namely, difference Ds from the standard card length=12.0 mm as shown in FIG. 11A), that the multi-fed cards can rotate clockwise (CW) until their ends extend 14 mm, in total, from the first locus Lc1 (namely, difference Ds from the standard card length=14 mm as shown in FIG. 11B even if the ends of the multi-fed cards extend more than 12 mm in total), and that the cards cannot rotate if the ends of the multi-fed cards extend more than 14 mm in total as shown in FIG. 11C.

As to whether the rotary frame F can rotate or not, the upper threshold value of the card length Lc and the lower threshold value of the card conveyance distance Ld can be calculated from the difference Ds between the card length and the standard card length. (The lower threshold value of the card length Lc and the lower threshold value of the card conveyance distance Ld are determined from the continuity. That is, if the card length Lc falls within the range of 86.6 mm<Lc≤98.6 mm, the cards can rotate in CW direction and CCW direction, and the card conveyance distance Ld falls within the range of 8.4 mm≤Ld<20.4 mm. If the card length Lc falls within the range of 98.6 mm<Lc≤100.6 mm, the cards can rotate in CW direction only, and the card conveyance distance Ld falls within the range of 6.4 mm≤Ld<8.4 mm. If the card length Lc exceeds 100.6 mm, the cards cannot rotate, and the card conveyance distance Ld is shorter than 6.4 mm. This is summarized in Table 1.

Thus, in Step S328 shown in FIGS. 8A and 8B, whether the multi-fed cards can be rotated in direction CCW or not is determined from the card conveyance distance Ld (number of pulses Np). The CPU need not calculate the card conveyance distance Ld in Step S318. (In Step S318, the card conveyance distance Ld is considered to facilitate the understanding of the invention, as in Step S320 described above and in Step S328 and S336 described later). If the ROM stores the data representing the relation between the number of pulses Np shown in FIG. 13 and "Rotation/Non-rotation" shown in Table 1 (e.g., relation table), and the data of the number of reference pulses described above, the CPU can determine whether the cards can be rotated or not, directly from the number of pulses Np. Then, the CPU determines whether the cards can be rotated or not, directly from the number of pulses Np.

Figure 9C:
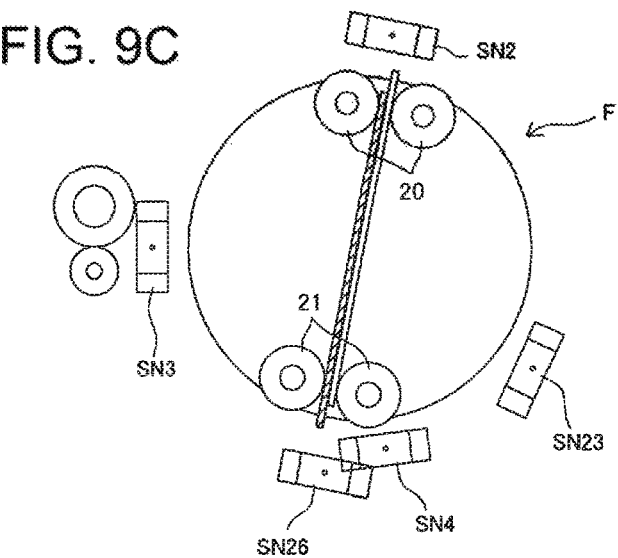
Figure 10A:
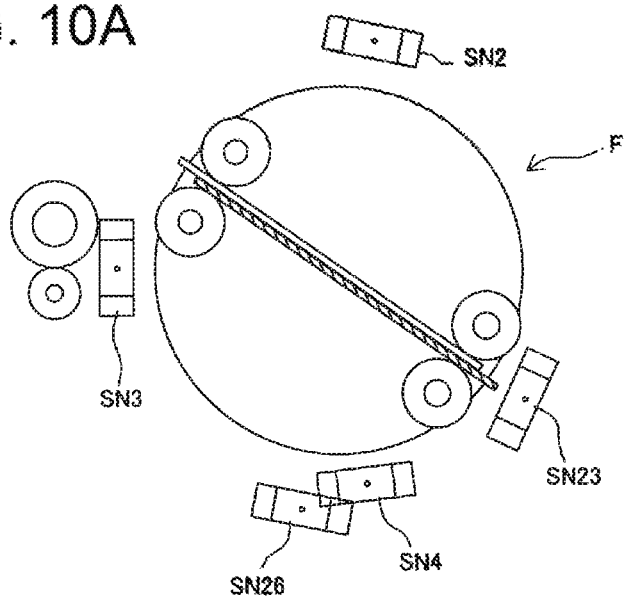
FIGS. 10A and 10B are diagrams schematically explaining how multi-fed cards are delivered from the rotary unit.
Figure 10B:
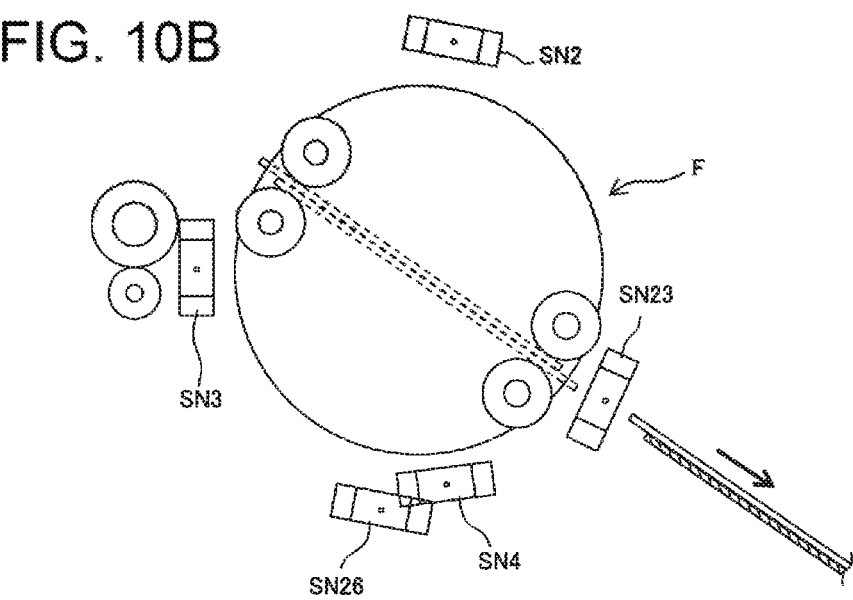

If Yes in Step S328, the process goes to Step S330, in which the centers of the multi-fed cards are positioned at the rotation center O (see FIG. 9C). In the next Step S332, the multi-fed cards are rotated (by 65°) in the CCW direction toward the rejected-sheet stacker 54 (see FIG. 10A). In Step S334, the rollers 20 and rollers 21 are rotated, delivering the multi-fed cards to the rejected-sheet stacker 54 (see FIG. 10B). Then, the process goes to Step S335. When the sensor SN23 detects the rear ends of the cards, the CPU determines that the multi-fed cards have been rejected into the rejected-sheet stacker 54.

If No in Step S328, the process goes to Step S336. In Step S336, it is determined whether the multi-fed cards can be rotated in the CW direction, from the card conveyance distance Ld (namely, from the number of pulses Np). If Yes in Step S336, the process goes to Step S338, in which it is determined whether the center parts of the cards are located at the rotation center O (see FIG. 9C). In the next Step S340, the multi-fed cards are rotated in the CW direction (at 115°), toward the rejected-sheet stacker 54 (see FIG. 10A). (However, the cards assume a different up-down relation different from that shown in FIG. 10A, because their positions are reversed in up-down direction while the roller pair 20 is positioned on the sensor SN23 side). In Step S342, the rollers 20 and rollers 21 are rotated, delivering the multi-fed cards into the rejected-sheet stacker 54 (see FIG. 10B). (However, the cards assume a different state because they are delivered by driving the first card-conveyance motor in the forward direction.) Then, the process goes to Step S335. In Steps S328 and S336, it is first determined whether the cards can be rotated in the direction CCW, not in the CW direction, because the cards are rotated from their received position toward the rejected-sheet stacker 54, by a small angle, in order to shorten the process time.

(1-6) Card Delivery if Rollers are Unable to Rotate

In the printing apparatus 1 according to this embodiment, if the rotary unit F is rotated while the rollers 20 and rollers 21 are holding multi-fed cards, these cards may interfere with the sensors arranged around the rotary unit F, and the rotary unit F may no longer rotate. In view of this, the printing apparatus 1 has a mode of conveying the multi-fed cards back to the medium supplying section C (upstream side), without rotating the rotary frame F. The operator may select this mode at the operation panel unit 5 (or host apparatus 101). How the printing apparatus 1 operates will be explained below, assuming that the operator has selected this operation mode.

If (a) No in Step S336 (that is, if the card conveyance distance Ld is smaller than a preset distance L2, i.e., 7.4 mm), (b) if Yes in S302, and (c) if Yes in Step S312, it is determined in Step S344 whether a backward conveyance mode is selected to convey the multi-fed cards back to the medium supplying section C without rotating the rotary frame F. If No in Step S344, the process goes to Step S352. If Yes in in Step S344, the process goes to Step S346. In Steps S346, it is determined, from the output of the sensor lever 69 (see FIG. 3) by way of the signal processing unit 73, whether the medium supplying section C (i.e., card cassette) has been removed from the cassette-holding area 68, or whether no cards have been detected.

Figure 12:
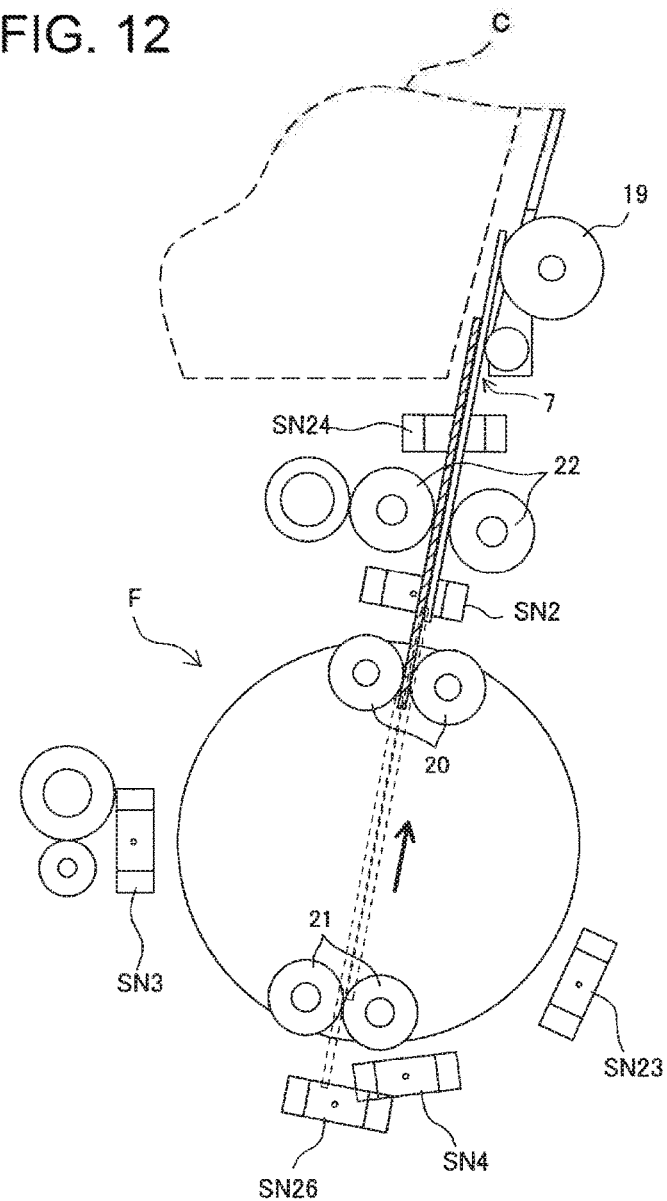
FIG. 12 is a diagram schematically showing how the multi-fed cards are sent back to the medium supplying section.

If No in Step S346, the process goes to Step S348. In Step S348, the operation panel unit 5 (more precisely, monitor 102 connected to the host apparatus 101 via the communications unit 71) displays, by way of the operation display control unit 76, a message prompting the operator to remove the card cassette. Then, the process returns to Step S346. (If No in Step S346 or in the loop of Step S348, the buzzer operating circuit 78 is driven in Step 348 for a preset time, causing a buzzer 6 to generate an alarm to the operator.) If Yes in Step S346, the process goes to Step S350, in which the first card-conveyance motor is driven in the reverse direction, conveying the multi-fed cards back to the medium supplying section C, and the process goes to Step S354. FIG. 12 shows the two cards conveyed in Step S350 back to the medium supplying section C.

(1-7) Efficiency of the Unjamming

In Steps S335, S352 and S354, the CPU makes the operation panel unit 5 (monitor 102) display an error message. In accordance with this message, the operator starts solving the problem as will be described below.

(a) In Step S352, the buzzer 6 is activated for a prescribed period of time, and the operation panel unit 5 displays an error message (informing the operator that two or more cards are being multi-fed, and telling the operator to unjam the printing section B). Then, the card supplying process subroutine and the card issuing routine are interrupted.

Then, the operator removes the medium supplying section C from the cassette-holding area 68, opens the front door 12 and opening-closing member 66, and manually rotates the unjamming dial, thereby unjamming the printing section B (as in the conventional printing apparatus). During the unjamming, essentially, the supply of the commercial available power to the power supply section 80 is stopped to ensure the safety for the operator. After unjamming the printing section B, the operator closes the front door 12 and the opening-closing member 66, and secures the medium supplying section C in the cassette-holding area 68, thus setting the printing apparatus 1 back to the initial state. Then, the operator turns on the power supply switch, supplying electric power to the printing apparatus 1 again. Further, the print data and magnetic and electric record data is transmitted from the host apparatus 101 to the printing apparatus 1 (more precisely, to memory 77). Thus, the printing apparatus 1 is initialized after the jamming related to Step S352 is eliminated.

(b) In Step S354, the buzzer 6 is activated, generating an alarm different from the alarm generated in Step S348, and the operation panel unit 5 (more precisely, monitor 102) displays a message telling the operator that two or more cards have been multi-fed and then conveyed back together. Then, the card supplying process subroutine and the card issuing routine are interrupted. The operator removes the medium supplying section C from the cassette-holding area 68 and then takes the multi-fed cards returned in Step S350 from the upper part of the printing apparatus 1, thereby unjamming the printing section B. The operator closes the opening-closing member 66 and sets the medium supplying section C back to the cassette-holding area 68.

(c) In Step S335, the operation panel unit 5 (more precisely, monitor 102) displays a message telling that a multi-feed has occurred and that milt-fed cards have been delivered to the rejected-sheet stacker 54 (but, the buzzer 6 is not activated). The card supplying process subroutine is interrupted. (The card issuing routine is also interrupted.) Since the multi-fed cards have been delivered to the rejected-sheet stacker 54, the operator need not perform unjamming.

The card supplying process (S204) is performed along with the primary transfer process (S202) in the card issuing routine (see FIG. 7). Therefore, the CPU determines the error, i.e., multi-feeding, during the primary transfer process. Upon determining the multi-feeding, the CPU stops the process of forming an image in the image forming region of the image forming unit B1, and terminates the card issuing routine. When the card issuing routine is performed again (from the beginning), the image forming region is handled as a used one. If Yes in Step S302, however, the image forming region is treated as an unused one when the card issuing routine is performed again, because the transfer film 46 is being conveyed (namely, the cueing is undergoing) before the platen roller 45 is pressed onto the thermal head 40.

Hence, as seen by comparing the jam eliminating efficiencies required in Steps S335, S352 and S354, the operator's labor of unjamming can be gradually reduced in Steps S335, S354 and S352 in the order they are mentioned.

(2) Recording Process

If the card supplying process (1) is normally finished, the CPU performs the recording process (2). In the recording process, the magnetic and electric record data desired to be recorded in the information recording section A are output and recorded in the card Ca. After the data are so recorded, the first card-conveyance motor is driven, conveying the card Ca, positioning the center part of the card Ca at the rotation center O. It is then determined whether a desired information recording section A is available or not. If Yes, the rotary unit F is rotated toward the information recording section, and the same process as first performed in the information recording section A as desired is then performed. If No, the recording process is terminated.

In the information recording section A, the data is read from the card Ca and compared with the data that should be recorded. That is, data verification is performed. In this embodiment, if the verification continuously fails three times, the card Ca is considered having any factor against the data recording and delivered, as an erroneous one, into the rejected-sheet stacker 54. At this point, the card supplying process (S204) is performed in parallel with the primary transfer process (Step S202). Therefore, the CPU immediately stops the image forming at the image forming region in the image forming unit B1, as in the case where a multi-feeing of cards occurs. The CPU then terminates the card issuing routine. When the card issuing routine is performed again, the image forming region is handled as a used one.

(3) Card Conveying Process

When the recording process (2) ends, the CPU executes the card conveying process (3). In the card conveying process, the card Ca is received from the information recording section A that carried out the recording the last time, and the first card-conveyance motor is driven, conveying the card Ca, positioning the center of the card Ca at the rotation center O. Then, the drive motor is driven, rotating the rotary unit F, thereby positioning the card Ca in the direction of the medium conveyance path P1. Thereafter, the first and second card-conveyance motors are driven, conveying the card Ca toward the conveyance rollers 29 and conveyance rollers 30.

When the sensor SN3 detects the rear end of the card Ca, the CPU stops the first card-conveyance motor. After the sensor SN3 detects the rear end of the card Ca, the CPU supplies a preset number of pulses to the second card-conveyance motor, thereby driving the same, and then stops the second card-conveyance motor. As a result, the card Ca has its ends nipped by the rollers 29 and rollers 30, respectively. The CPU keeps the card Ca waiting at the rollers 29 and rollers 30 until the sensor Se3 detects the marks formed on the image forming region of the transfer film 46, so that the card Ca and the image formed in the image forming region of the transfer film 46 may reach the transfer unit B2 at the same time. When the sensor Se3 detects the marks, the second card-conveyance motor is driven again, conveying the card Ca toward the transfer unit B2.

As shown in FIG. 7, the transfer unit B2 performs a secondary transfer process, transferring the image from the transfer surface of the transfer film 46 to one side of the card Ca. Prior to the secondary transfer process, the CPU controls a heat controller 33, raising the temperature of the heater incorporated in the heat controller 33 to a prescribed value.

The transfer film 46 subjected to the secondary transfer process is separated (or peeled) from the card Ca by the peeling pin 79 (see FIG. 2) arranged between the heat roller 33 and the conveyance rollers 37 and is then conveyed toward the supply roll 47. Meanwhile, the card Ca having the image transferred is conveyed in the medium conveyance path P2 toward the de-curling mechanism G that is located downstream. The CPU keeps driving the second card-conveyance motor, and stops the second card-conveyance motor after the rear end of the card Ca passes the peeling pin 79 (see FIG. 2). The card Ca is thereby nipped by the rollers 37 and rollers 38.

In the next Step S208, the eccentric cam 36 is rotated, pushing down the de-curling unit 34 toward another de-curling unit 35. The de-curling unit 34 and the de-curling unit 35 therefore clamp the card Ca between them. The card Ca is thereby de-curled and straightened up. Then, the process goes to Step S210.

2-2. Printing on the Other Side of the Card

In Step S210, it is determined whether data should be printed on both sides of the card. If No, the process jumps to Step S220. If Yes, the process goes to Step S212. In Step S212, the image forming unit B1 performs the primary transfer process as in Step S202, forming an image (i.e., mirror image) on the other side (e.g., reverse side) of the transfer film 46. Then, the process goes to Step S216.

While the primary transfer process is being performed in Step S212, and, in Step S214, the CPU controls the medium supplying section C, thereby conveying the card Ca nipped by the rollers 37 and rollers 38 and positioned in the de-curling mechanism G, to the rotary unit F through the medium conveyance paths P2 and P1. The card Ca held by the rollers 20 and rollers 21 is rotated by 180° (thereby turning the card Ca upside down) and is then conveyed toward the conveyance rollers 29 and conveyance rollers 30. In the next Step S216, the secondary transfer process is performed in the transfer unit B2 in the same way as performed in Step S206, thereby transferring the image from the next image forming region to the other side of the card Ca.

Then, in Step S218, the de-curing process is performed in the same way as in Step S208, straightening up the card Ca. In the next Step S220, the card Ca is delivered toward the stacker 60, and the card issuing routine is terminated.

3. Advantages and Modifications

The advantages of the printing apparatus 1 according to this embodiment will be described below.

3-1. Advantages

In the printing apparatus 1 according to this embodiment, if the card conveyance distance Ld is found shorter than the preset distance L1 (20.4 mm) (namely, if Yes in Step S320), it is determined whether the multi-fed cards can be rotated in such a direction as to be taken out from the rotary unit F (in Steps S328 and S336). If Yes, the rotary unit F is rotated and the rollers 20 and rollers 21 are driven, positioning the card Ca at such a position as to be taken out. This can enhance the unjamming efficiency. As the rollers 20 and 21 are so driven, the sensor SN2 arranged upstream the rotary unit F in the card conveyance direction detects the rear end of the card Ca being conveyed downstream in the card conveyance direction in the medium conveyance path P0, and the sensor SN26 arranged downstream the rotary unit F in the card conveyance direction detects the front end of the card Ca. The card conveyance distance Ld is thereby detected. Since the sensor SN2 detects the rear end of the card Ca after the card Ca is conveyed from the cleaning rollers 22 to the rollers 20, a detection error of the card conveyance distance Ld is avoided as the card is so conveyed. Further, since the drive pulses Np supplied to the first card-conveyance motor that drives the rollers 20 and 21 are counted after the cleaning rollers 22 removed dust and the like from the card Ca, the number of drive pulses Np counted is correct, not influenced by dust or the like. Hence, the card conveyance distance Ld can be correctly detected in the printing apparatus 1 according to this embodiment.

In the printing apparatus 1 according to this embodiment, if the cards are found enable to rotate, it is determined whether the multi-fed cards can be rotated in at least one of the directions CCW and CCW (Steps S328 and S336). The cards can therefore rotate in either direction. Further, since the cards can be rotated in a direction by a smaller angle than they are rotated in the other direction, the time the cards need to rotate can be shorter than otherwise.

In the printing apparatus 1 according to this embodiment, the cards nipped together by the rollers 20 and rollers 21 are rotated around the rotation center O of the rotary unit F, with their center parts positioned at the rotation center O. The cards can therefore be rotated in any other manner.

In the printing apparatus 1 according to this embodiment, the multi-fed cards are conveyed toward the rejected-sheet stacker 54 if they can be rotated, and conveyed to the medium supplying section C if they cannot be rotated. This more enhances the operator's unjamming efficiency than by the conventional unjamming technique of rotating the unjamming dial.

In the printing apparatus 1 according to this embodiment, the sensor SN2 arranged upstream the rotary unit F in the card conveyance direction detects the rear end of the card Ca conveyed, and the sensor SN26 arranged downstream the rotary unit F in the card conveyance direction detects the font end of the card Ca conveyed, thereby detecting the card conveyance distance Ld. Hence, the precision of detecting the card conveyance distance Ld can be improved.

3-2. Modification

In this embodiment, the multi-fed cards Ca can be delivered to the rejected-sheet stacker 54 or to the medium supplying section C. This invention is not limited to this embodiment. Nor the cards need be delivered from a particular position to the rejected-sheet stacker 54.

Figure 14A:
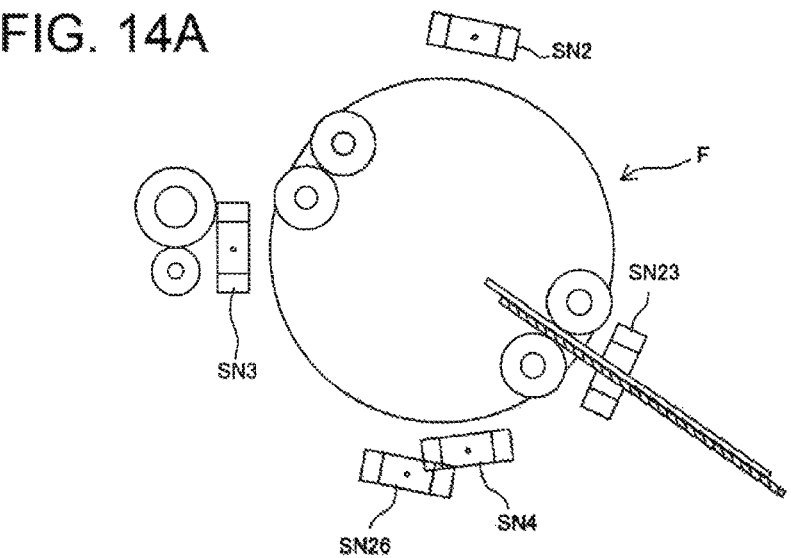
FIGS. 14A to 14C schematically show another embodiment of the invention, in which the multi-fed cards are positioned at delivery position.

As shown in FIG. 14A, for example, the multi-fed cards may be nipped by rollers 20 or rollers 21 positioned near the sensor SN23, not delivered to the rejected-sheet stacker 54. If the rollers 20 or rollers 21 are stopped rotating in this state, the operator needs only to pull the cards from the rollers 20 or rollers 21. This not only enhances the unjamming efficiency, but also prevents any card (found as unfit for data recording, in the information recording section A) from mixing with the (reusable) multi-fed cards.

To prevent such card mixing, another stacker for receiving multi-fed cards may be secured to the housing 2, above the rejected-sheet stacker 54, and the multi-fed cards conveyed from the rollers 20 (shown in FIG. 2) in the horizontal direction may be delivered to the other stacker. In this case, a sensor may be used to detect the rear ends of the cards, thereby to determine that the cards have been delivered to the other stacker. To prevent dust or the like from entering the housing 2, a plate-shaped member or the like may be driven to open and close the outlet port of the housing 2, by an electromagnetic solenoid or a mini-motor.

Figure 14B:
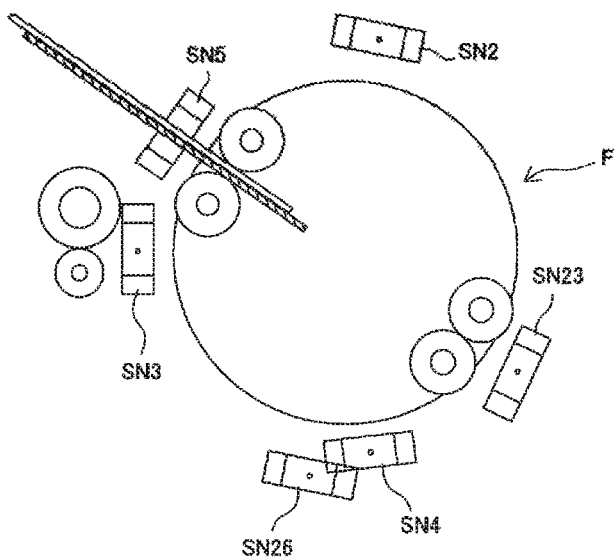

In this embodiment, the three recording units constituting the information recording section A are optional components. If the noncontact IC recording unit 23 is not used, the multi-fed cards may be nipped at one end by the rollers 20 or rollers 21 as shown in FIG. 14B. In this case, the unjamming can be easily performed, only by opening the upper cover 67 of the opening-closing member 66. If the noncontact IC recording unit 23 is incorporated in the opening-closing member 66, the unjamming can be easily performed from above, only if the upper cover 67 is opened.

Figure 14C:
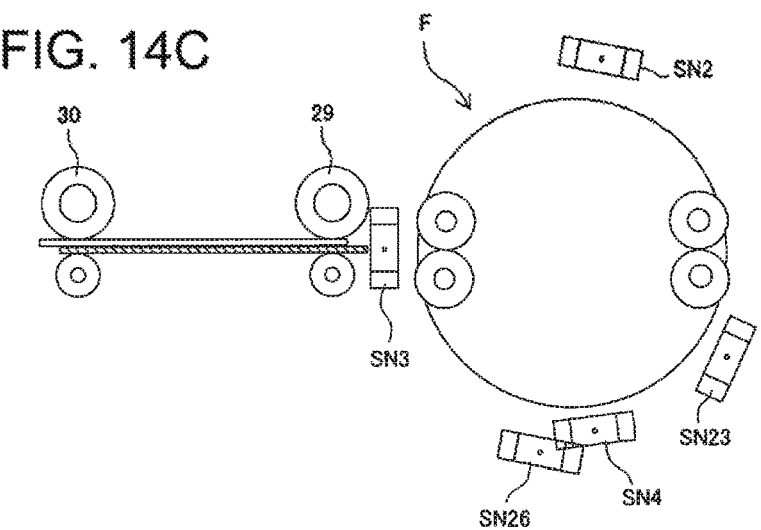

As shown in FIG. 14C, the multi-fed cards conveyed may be kept nipped by the conveyance rollers 29 and conveyance rollers 30. In this case, too, the operator can make an easy access to these cards. The unjamming efficiency is therefore higher than in the case where the cards are held in the rotary unit F. The cards may be conveyed to the medium storing section D.

In this embodiment, the sensor SN2 and the sensor SN26 are used to detect the card conveyance distance Ld. This invention is not limited to this, nonetheless. For example, the front and rear ends of the card Ca may be detected by the sensor SN2 only, to determine the card conveyance distance Ld. In this case, dust may stick to the cleaning rollers 22. In view of this, a pair of rollers may be arranged between the cleaning rollers 22 and the sensor SN2 shown in FIG. 4, and may be driven by the first card-conveyance motor so as to act as primary rollers to convey cards to the rotary unit F.

In this case, if the card conveyance distance Ld is longer than the preset distance L1, it is determined that cards are multi-fed or that a card longer than the standard-size card is fed. More specifically, the angle by which the conveyer rollers rotate from the time when the front ends of the cards pass the sensor SNS2 to the time when the rear ends of the cards pass the sensor SN2 is detected (namely, the distance Ld the cards are conveyed is detected). If the distance Ld detected is longer than the length (85.6 mm) of standard-size card, it is determined that cards are multi-fed. If 84.6 mm≤distance Ld≤86.6 mm, it is determined that one card is conveyed as desired. If 86.6 mm<distance Ld≤98.6 mm, it is determined that cards are multi-fed and that the rotary unit F can rotate in both the CW direction and the CCW direction. If 98.6 mm<distance Ld≤100.6 mm, it is determined that the rotary unit F can rotate in the CW direction only. If the distance Ld is longer than 100.6 mm, it is determined that the rotary unit F cannot rotate at all. After any one of these states has been determined, the modification operates in the same way as the embodiment described above, and how the modification operates thereafter will not be explained herein.

In the embodiment described above, the rotary unit F is a device for changing the direction of conveying the card Ca. However, this invention can, of course, be applied to a device for rotating the card by an angle smaller than 180°, as is disclosed in Patent Document 3.

In the embodiment, the printing apparatus (image forming apparatus) is an indirect printing type. Nevertheless, this invention is not limited to this type, and can be applied to a direct printing type. Further, in the embodiment, the platen roller 45 is pressed onto the thermal head 40 in the image forming unit B1. Instead, the thermal head 40 may be pressed onto the platen roller 45. In this case, the platen need not be of the type exemplified, but the platen should preferably be a type that would not impair the conveyance of the transfer film 46 or the ink ribbon 41. Moreover, in the embodiment, the heat roller 33 is pressed onto the platen roller 45. Instead, the platen roller 45 may be pressed onto the heat roller 33.

In the embodiment, the image to be formed on one side of the card Ca is formed in the image forming region of the transfer film 46 in the image forming unit B1 (S202), the image is transferred to one side of the card Ca in the transfer unit B2 (S206), an image is formed on the next image forming region of the transfer film 46 in the image forming unit B1 (S212), the card Ca is conveyed, at the same time, to the rotary unit F and is rotated by 180° (S214), and an image is transferred to the other side of the card Ca in the transfer unit B2 (S216). Instead, an image to be formed on one side of the card Ca may be formed in the image forming region of a transfer film 46 in the image forming unit B1, an image to be formed on the other side of the card Ca may then be formed in the next image forming region of the transfer film 46, the image may be transferred to one side of the card Ca in the transfer unit B2, the card Ca may be conveyed to the rotary unit F and be rotated by 180°, and an image may be transferred to the other side of the card Ca.

In the embodiment, the printing apparatus receives the print data and the magnetic and electric record data from the host apparatus 101. This invention is not limited to the embodiment, nevertheless. If the printing apparatus 1 is a member of a local network, it may receive data from not only the host apparatus 101, but also a computer connected to the local network. Also, the magnetic and electric record data may be input via the operation panel unit 5. Further, if the printing apparatus 1 is connected to an external data storage medium such as a USB memory or a memory card, it can acquire the print data and the magnetic and electric record data by fetching information from the external data storage medium. Still further, the printing apparatus 1 may receive image data (Bk image data and R, G and B color image data) instead of print data (Bk print data and Y, M and C color print data) from the host apparatus 101. In this case, the image data received may be converted to print data in the printing apparatus 1.

In the embodiment, the sensor SN26 for detecting the front end of a card Ca is provided downstream the rollers 21 in the card conveyance direction. The sensor SN26 may instead be secured to the frame of the rotary unit F and may be located between the rollers 20 and the rollers 21. In this case, the shaft of the rotary unit F is a hollow cylinder, and wires extend from the sensor SN26 through the shaft and are connected to the signal processing unit 73. In accordance with the output of a phase sensor for the rotary unit F, the control section 70 controls the rotary unit F, no to rotate through equal to or more than 360° in one direction.

If the sensor SN26 is located between the rollers 20 and the rollers 21, the angle through which the rollers 20 are rotated after the sensor SN26 detects the front end of the card Ca until the sensor SN2 detects the rear end of the card Ca may be measured, thereby to detect the distance the card Ca has been conveyed. In this case, if the distance Ld the card Ca is conveyed from the time when the sensor SN26 detects the front end of the card Ca until the time when the sensor SN2 detects the rear end of the card Ca is different from the preset distance L1 (more precisely, longer than the preset distance L1), it is determined that cards are multi-fed or that a card of any size other than the standard size is conveyed.

In the embodiment described above, the conveyance members the rotary unit F has are a pair of rollers 20 and a pair of rollers 21. Instead, the rotary unit F may have one pair of rollers or three or more pairs of rollers.

This application is based upon and claims the benefit of priority from the prior Japanese Patent Applications Nos. 2016-206656 and 2016-206657, the entire contents of which are incorporated herein by reference.

What is claimed is:

1. A medium conveying apparatus comprising:
   a conveyance section configured to convey a medium;
   a direction changing section configured to change a direction in which the medium is conveyed by the conveyance section;
   a detection section configured to detect a distance the medium has been conveyed by the conveyance section; and
   a control section configured to control the direction changing section,
   wherein if the distance detected by the detection section is shorter than a preset distance L1, the control section determines whether the medium can be positioned in such a direction as to be delivered from the direction changing section, and if the medium can be so positioned, the control section controls the direction changing section to position the medium in said direction.

2. The medium conveying apparatus according to claim 1, wherein if the distance detected by the detection section is shorter than the preset distance L1, the control section determines whether the medium can be positioned in a direction to be delivered as an erroneous one.

3. The medium conveying apparatus according to claim 1, wherein the detection section has first and second sensors arranged upstream and downstream of the direction changing section in the medium conveyance direction, and is used to detect rear and front ends of the medium conveyed by the conveyance section to detect the distance the medium has been conveyed; and the control section determines whether the medium can be positioned in such the direction as to be delivered from the direction changing section, if the distance detected by the detection section is shorter than the preset distance L1.

4. The medium conveying apparatus according to claim 3, wherein if the distance the medium has been conveyed is equal to or longer than a preset distance L2 (L2 <L1), the control section determines that the medium can be positioned in such the direction as to be delivered; and if the distance the medium has been conveyed is shorter than the preset distance L2, the control section determines that the medium cannot be positioned in such the direction as to be delivered.

5. The medium conveying apparatus according to claim 1, wherein the direction changing section is a rotary member configured to hold and rotate the medium; and
if the control section determines that the medium can be positioned to be delivered, it first controls the conveyance section, thereby positioning a center part of the medium at a rotation center of the rotary member, and then controls the rotary member, rotating the medium in the direction to be delivered.

6. The medium conveying apparatus according to claim 5, wherein if the distance the medium has been conveyed is shorter than the preset distance L1, the control section determines, from the distance the medium has been conveyed, whether the medium can be rotated in at least one of clockwise and counterclockwise directions.

7. The medium conveying apparatus according to claim 1, wherein the direction changing section is a rotary member configured to hold and rotate the medium; and if the control section determines that the medium cannot be positioned to be delivered, it controls the conveyance section, thereby conveying the medium back upstream the direction changing section without rotating the rotary member.

8. The medium conveying apparatus according to claim 7, wherein if the distance the medium has been conveyed is shorter than the preset distance L1, the control section determines, from the distance the medium has been conveyed, whether the medium can be rotated in at least one of clockwise and the counterclockwise directions.

9. An image forming apparatus comprising:
   a conveyance section configured to convey a medium;
   a direction changing section configured to change a direction in which the medium is conveyed by the conveyance section;
   a detection section configured to detect a front end and a rear end of the medium conveyed by the conveyance section;
   an image forming section configured to form an image on the medium; and a control section configured to control the conveyance section, the direction changing section, the detection section, and the image forming section, wherein the control section controls the detection section to detect the front end and the rear end of the medium, thereby calculating a medium length from the front end to the rear end of the medium conveyed by the conveyance section, if the medium length is longer than a preset distance L, the control section determines whether the medium can be positioned in such a direction as to be delivered from the direction changing section, and if the medium can be so positioned, the control section controls the direction changing section to position the medium in said direction, and if the medium length is equal to or shorter than the preset distance L, the control section controls the conveyance section to convey the medium to the image forming section and controls the image forming section to form the image on the medium.

10. A medium conveying apparatus comprising:

a conveyance section configured to convey a medium;

a direction changing section configured to change a direction in which the medium is conveyed by the conveyance section;

a detection section configured to detect a front end and a rear end of the medium conveyed by the conveyance section; and a control section configured to control the conveyance section, the direction changing section, and the direction changing section, wherein the control section controls the detection section to detect the front end and the rear end of the medium, thereby calculating a medium length from the front end to the rear end of the medium conveyed by the conveyance section, if the medium length is longer than a preset distance L3, the control section determines whether the medium can be positioned in such a direction as to be delivered from the direction changing section, and if the medium can be so positioned, the control section controls the direction changing section to position the medium in said direction.

11. The medium conveying apparatus according to claim 10, wherein if the medium length is equal to or shorter than a preset distance L4 which is longer than the preset distance L3, the control section determines that the medium can be positioned in such the direction as to be delivered, and if the medium length of the medium is longer than the preset distance L4, the control section determines that the medium cannot be positioned in such the direction as to be delivered.

* * * * *